(12) United States Patent
Krakower et al.

(10) Patent No.: US 11,928,671 B2
(45) Date of Patent: Mar. 12, 2024

(54) SYSTEMS AND METHODS FOR DYNAMIC ALLOCATION OF RESOURCES USING AN ENCRYPTED COMMUNICATION CHANNEL AND TOKENIZATION

(71) Applicant: Ferry Pay Inc., Brooklyn, NY (US)

(72) Inventors: Brian Scott Krakower, Huntington Beach, CA (US); Efren Ramirez, North Tustin, CA (US)

(73) Assignee: Ferry Pay Inc., Brooklyn, NY (US)

( * ) Notice: Subject to any disclaimer, the term of this patent is extended or adjusted under 35 U.S.C. 154(b) by 0 days.

(21) Appl. No.: 17/393,159

(22) Filed: Aug. 3, 2021

(65) Prior Publication Data

US 2022/0138729 A1    May 5, 2022

Related U.S. Application Data

(60) Provisional application No. 63/107,031, filed on Oct. 29, 2020.

(51) Int. Cl.
| | | |
|---|---|---|
| *G06Q 20/38* | (2012.01) | |
| *G06Q 20/02* | (2012.01) | |
| *G06Q 20/20* | (2012.01) | |
| *G06Q 20/40* | (2012.01) | |

(52) U.S. Cl.
CPC ......... *G06Q 20/382* (2013.01); *G06Q 20/027* (2013.01); *G06Q 20/20* (2013.01); *G06Q 20/401* (2013.01); *G06Q 2220/00* (2013.01)

(58) Field of Classification Search
CPC .................................................. G06Q 20/382
USPC .......................................................... 705/67
See application file for complete search history.

(56) References Cited

U.S. PATENT DOCUMENTS

| | | | |
|---|---|---|---|
| 10,726,436 B2 | 7/2020 | Stepanovich | |
| 2009/0322555 A1 | 12/2009 | McIntosh et al. | |
| 2010/0274678 A1 | 10/2010 | Rolf et al. | |
| 2010/0299265 A1 | 11/2010 | Walters et al. | |
| 2013/0254117 A1 | 9/2013 | von Mueller et al. | |
| 2014/0067499 A1* | 3/2014 | Stepanovich | G06Q 30/0214 |
| | | | 705/14.16 |
| 2014/0164151 A1 | 6/2014 | Hockley | |
| 2014/0365322 A1* | 12/2014 | Phillips | G06Q 40/00 |
| | | | 705/16 |
| 2015/0262146 A1 | 9/2015 | McKim, Jr. | |

(Continued)

*Primary Examiner* — Chinedu C Agwumezie

(74) *Attorney, Agent, or Firm* — Knobbe, Martens, Olson & Bear LLP

(57) ABSTRACT

An authentication and encryption computer system and method are disclosed. An encrypted channel is established with a first device. Transaction information is received over the encrypted channel, including an instrument identifier, wherein the instrument identifier is tokenized, a first amount for item acquisition by a first person, a second amount specified by the first person, and identification information of a second person. An identity of a user of a second device is authenticated to determine that the user is the second person and in response to such authentication, a user interface is provided, including the second amount and an identification of one or more entities is displayed. An instruction is received to distribute at least a portion of the second amount to specified entities. A secure communication is established via remote systems and a portion of the second amount is distributed among respective destinations associated with the specified entities.

18 Claims, 48 Drawing Sheets

(56) References Cited

U.S. PATENT DOCUMENTS

| | | |
|---|---|---|
| 2017/0124536 A1 | 5/2017 | Bookstaff |
| 2018/0108000 A1 | 4/2018 | Bhattacharjee et al. |
| 2018/0240174 A1* | 8/2018 | Douglas ................ G06Q 30/01 |
| 2019/0087812 A1 | 3/2019 | Karakaplan |
| 2019/0251538 A1* | 8/2019 | Grosh ................... G06Q 20/14 |
| 2019/0266026 A1* | 8/2019 | Halim .................. G06F 9/5077 |
| 2019/0268149 A1 | 8/2019 | Kariv et al. |
| 2019/0303606 A1 | 10/2019 | Erofeev |
| 2019/0385159 A1* | 12/2019 | Beatty ................. G06Q 20/385 |
| 2021/0103901 A1* | 4/2021 | Sutton-Shearer ...... G06Q 50/10 |
| 2021/0243598 A1 | 8/2021 | Sheffield et al. |
| 2021/0279701 A1 | 9/2021 | Takamoto et al. |

* cited by examiner

```
ELIZABETH NOVOTNY #123
.........................................
SALES
CREDIT/GIFT CARD      $106.00
CASH                  $103.00
.........................................
                      $209.00

TIPS
CREDIT/GIFT CARD      $17.00
CASH                  $20.00
.........................................
                      $37.00

TOTAL TIPOUT          $9.00
.........................................
PAYCARD TIPS RECEIVED $8.00
.........................................
PAIDOUT               $0.00
.........................................
FINAL CASH DUE        $103.00

TIP OUTS
$3.00 CHARLENE DEZEMBER
$2.00 ANDREA ESPINOZA
$2.00 ARLENE NUNEZ
$1.00 CLAIRE MILLIGAN
$1.00 JESSICA CROSSON
.........................................
$9.00 TOTAL TIPOUT
```

SYSTEMS AND METHODS FOR DYNAMIC ALLOCATION OF RESOURCES USING AN ENCRYPTED COMMUNICATION CHANNEL AND TOKENIZATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Field of the Invention

The present disclosure relates to network and data security, and the secure allocation of resources over networks.

Description of the Related Art

Conventionally, an entity may be allocated resources in a manner that may enable such resources to be intercepted. Further, such resources may be distributed in an inefficient manner.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An aspect of the present disclosure relates to an authentication and encryption computer system, the authentication and encryption computer system comprising: one or more processing devices; a network interface; non-transitory memory that stores instructions that when executed by the one or more processing devices are configured to cause the authentication and encryption computer system to perform operations comprising: establish an encrypted communication channel with a point of sale (POS) device; receive, over the encrypted communication channel from the point of sale (POS) device, information decrypted using a first key, the information including transaction information for a first transaction, including an instrument identifier, a first amount for acquisition of a first set of items by a first person, a second amount specified by the first person, and information enabling an identification of a service person involved in providing the first set of items to the first person; receive, via the network interface, a communication from a first device; authenticate an identity of a user of the first device, the first device in communication with the authentication and encryption computer system, as being the service person; at least partly in response to authenticating the identity of the user of the first device as being the service person: provide, via the first device, a user interface, the user interface including the second amount and an identification of one or more people and/or groups of people; receive, via the user interface an instruction from the service person to distribute at least a portion of the second amount to one or more specified people and/or groups of people; and communicate with one or more systems to cause the portion of the second amount to be added by the one or more systems among respective destinations associated with the specified people and/or groups of people.

An aspect of the present disclosure relates to computer-implemented method, the method comprising: establishing an encrypted communication channel with a point of sale (POS) device; receiving over the encrypted communication channel from the point of sale (POS) device information including transaction information for a first transaction, including an instrument identifier, a first amount for acquisition of a first set of items by a first person, a second amount specified by the first person, and information enabling an identification of a service person involved in providing the first set of items to the first person; receiving a wireless communication from a first device; authenticating an identity of a user associated with the first device as being the service person; at least partly in response to authenticating the identity of the user of the first device as being the service person: enabling, via the first device, a user interface to be provided, the user interface including the second amount and an identification of one or more people and/or groups of people; receiving, via the user interface, an instruction from the service person to distribute at least a portion of the second amount to one or more specified people and/or groups of people; and communicating with one or more computer systems to cause the portion of the second amount to be added by the one or more computer systems among respective destinations associated with the specified people and/or groups of people.

An aspect of the present disclosure relates to a non-transitory memory that stores programmatic code that when executed by the at least one processing device, cause the at least one processing device to perform operations comprising: establish an encrypted communication channel with a point of sale (POS) device; receive over the encrypted communication channel from the point of sale (POS) device information including transaction information for a first transaction, including an instrument identifier, a first amount for acquisition of a first set of items by a first person, a second amount specified by the first person, and information enabling an identification of a service person involved in providing the first set of items to the first person; receiving a communication from a first device; authenticating an identity of a user associated with the first device; at least partly in response to authenticating the identity of the user of the first device enable, via the first device, a user interface to be provided, the user interface including the second amount and an identification of one or more people and/or groups of people; receive, via the user interface, an instruction from the service person to distribute at least a portion of the second amount to one or more specified people and/or groups of people; and communicate with one or more computer systems to cause the portion of the second amount to be added by the one or more computer systems among respective destinations associated with the specified people and/or groups of people.

BRIEF DESCRIPTION OF THE DRAWINGS

While each of the drawing figures illustrates a particular aspect for purposes of illustrating a clear example, other embodiments may omit, add to, reorder, and/or modify any of the elements shown in the drawing figures. For purposes of illustrating clear examples, one or more figures may be described with reference to one or more other figures, but using the particular arrangement illustrated in the one or more other figures is not required in other embodiments.

DETAILED DESCRIPTION

Figure 1:
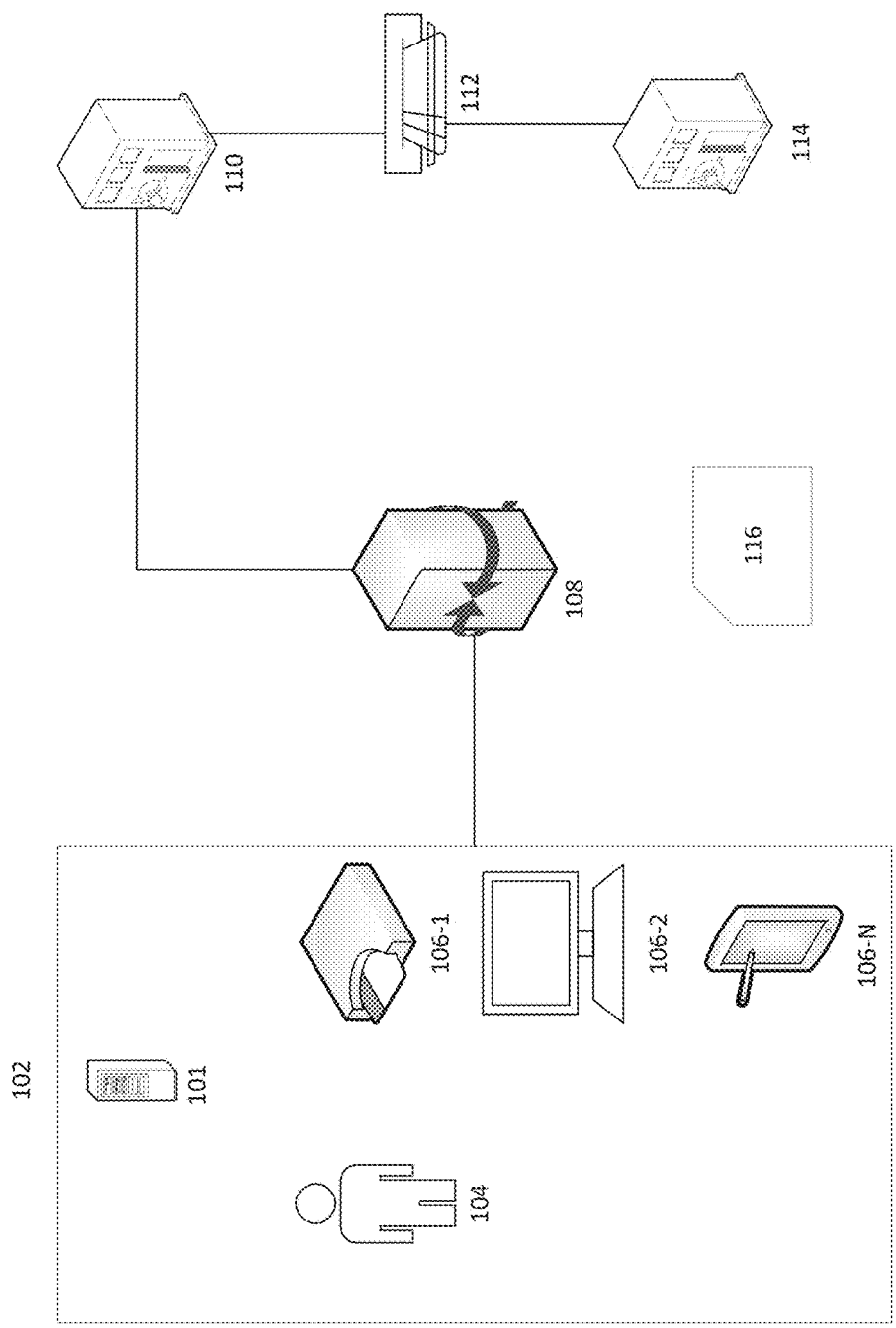
FIG. 1 illustrates an example networked environment.

Systems and methods are described herein that enable electronically collected resources to be managed, a portion thereof to be electronically allocated to one or more destinations/recipients based on one or more criteria, and a portion thereof then redistributed to one or more recipients in accordance with one or more instructions and/or rules.

Using conventional systems, it has not been possible to securely enable a user to share such resources via commands provided via a user device, and particularly, via a small handheld user device. Further, using conventional systems, it has not been possible to ensure such resources are shared in a reliable manner in accordance with resource sharing commands. Aspects of the present disclosure relate to systems and methods to overcome the foregoing technical challenges. For example, techniques are described for the encryption, decryption, and tokenization of sensitive data to enhance secure network communications. By way of further example, interfaces are described that are particularly suitable for devices with small displays (e.g., smart phones), and that reduce the amount of navigation needed among user interfaces. Yet further, techniques are described that reduce computer resource utilization to thereby enhance computer system performance.

At certain establishments, such as restaurants, payments may be made via secure communication channels, with payments transmitted and/or received via one or more electronic terminals (e.g., via electronic payment application installed on a user device, via a tablet or other computer device placed on a user table, via a wireless or wired credit/debit card reader, and/or otherwise, which may be referred to as a point of sale (POS) terminal). Such payments may be for the payment of a set price for goods (e.g., food items ordered as part of a meal) or services provided to one or more customers. However, in certain instances a customer may include in the payment a customer-specified payment amount, such as a gratuity (e.g., a tip). A customer-specified payment amount may be identified separately from the set price payment in a transmission to a remote system (e.g., a payment processing system).

Optionally, the customer-specified payment may be associated with a specific area (e.g., a table or bar seat at which the customer was served food, a valet station at a hotel, etc.) and/or a specific service provider (e.g., a waiter or parking or luggage valet). In certain entities, the customer-specified payment may be allocated by the customer (and/or the establishment that provided goods and/or services to the customer) to a single person (e.g., a waiter or valet). However, that person may wish to share all or a portion of the customer-specified payment amount with one or more other people at the establishment, such as those who participated in providing service to the customer specifically, or that generally support providing services to customers during a given shift.

The shared portion may be specified as a percentage (e.g., 20% of the customer-specified payment amount and/or a fixed currency amount, such as $3.00). By way of illustration, if a waiter is allocated all of the customer-specified payment amount, the waiter may wish to share the customer-specified payment amount with other workers or sets of workers (e.g., worker teams) at the restaurant (e.g., the busser, the bartender, the waiter assistant, etc., and/or other positions if the relevant law and regulations permit workers at such position to receive tip outs). Specific positions may be included or excluded by the system from sharing tips. Optionally, as will be described elsewhere herein, a user interface may be provided (e.g., via a webpage presented by a browser on a user device or via a dedicated application hosted on a device, such as a tablet computer or smart phone) via which the waiter (or other sharing user) can specify a share (e.g., a pro rata or proportionate share) to be allocated to specific other workers or sets of workers. Such allocation specification can be stored in an account record associated with the sharing user.

Optionally, such allocation may be specified prospectively so that portions of future customer-specified payments for a user will be allocated in accordance with such sharing user specification. Optionally, such allocation may be specified retrospectively so that portions of already received customer-specified payments for the user will be allocated in accordance with such sharing user specification. Optionally, shared amounts may be included in a paycheck, assigned to a pay card, a checking account, a bank account (e.g., via direct deposit), a debit card, or other financial instrument or account associated with the recipient of the shared portion, or the shared amounts may be utilized to offset funds owed by the tip out-recipient to the tip out-recipient's employer (e.g., for cash outs, or for health insurance, disability insurance, or for other benefits).

In an example payment processing process, payment data is transmitted (e.g., via a wireless or wired network) from the POS terminal to a payment processing system. The payment data may optionally be first transmitted to a relay system other than the payment processing system, such as a system local to the facility at which the POS terminal is located, which may then transmit the payment data to a remote payment processing system. The payment data may include a financial instrument identifier (e.g., a credit card number, a debit card number, a loyalty card number), an account identifier (where an associated account record may include a payment instrument identifier), data which may identify the set price, taxes calculated on the set price, and/or customer-specified payment amount, and an identifier of a recipient of the customer-specified payment amount (e.g., a waiter name, a unique identifier code, etc.). As discussed elsewhere herein, the disclosed system may also be configured to process cash payments and tips.

The total payment amount (including the price for the goods and/or services, taxes calculated on the price, and/or customer-specified payment amount) may be charged or debited using the customer's financial instrument. The customer-specified payment amount may be electronically assigned to an account (which may be in the form of a payment instrument) of the person that provided service to the customer, and/or to recipients designated (via the user interface described above) by the person that provided service to the customer.

By way of illustration, the customer-specified amount may be added to a payroll account. A payroll account may optionally include a prepaid debit card that employers can use to pay workers or contractors. For example, on a given payday for a given pay period, the payroll card/account may be "loaded" with the worker's wages and tips for that pay period. Thus, the credit card tips may be loaded each pay period or daily, and the workers may still take home any cash tips they received. By way of illustration, a holder of a pay account may use the card as a debit card to purchase products or services from other retailers, may use the pay account to withdraw wages or other amounts added thereto through an automatic teller machine or bank teller or at retail establishments that allow for withdrawals, or may write themselves a check from the payroll account. Optionally, a worker may choose the form of payment from a plurality of presented options (e.g., a pay card, a check (e.g., to receive the applicable worker wages without a fee or hold time), or otherwise) via a user interface, and so the worker is not restricted to utilization of a pay card.

By way of further example, optionally, the POS terminal transmits some or all of the payment data to a payment gateway. If the payment data is not yet encrypted, the payment gateway may encrypt some or all of the payment data. Optionally, even if the payment data from the POS terminal is already encrypted, the payment gateway may apply another layer of encryption to the received payment data to further enhance the payment data security and to make it more difficult for an entity to improperly intercept the payment data or improperly use the payment data. The payment gateway may relay the encrypted payment data to a payment processing system (e.g., associated with a payment processing entity) that communicates with a financial institution associated with the customer's payment instrument to ensure the payment instrument is valid and still active.

If the financial institution associated with the customer's payment instrument transmits back a message to the payment gateway indicating that the customer's payment has been approved (indicating that the payment instrument is valid, active, and has sufficient funds or credit limit to cover the total payment amount), a corresponding indication may be transmitted to the POS terminal, which may in turn display a payment approved indication or the like. In addition, an electronic payment receipt may be generated and transmitted to a destination associated with the customer (e.g., an email address, a short messaging service address, or other address) and/or a payment receipt may be physically printed and provided to the customer.

The payment gateway may transmit corresponding data to the payment processing system, which executes the transaction, transferring money to the financial account associated with the business entity that provided the customer with the corresponding goods and services (e.g., food at a restaurant).

The payment processing system or the business entity may add an amount corresponding to the customer-specified amount (e.g., the tip) to the corresponding service provider (e.g., a waiter).

Thus, as described herein, an online portal is provided that interfaces with a point of sale of system that enable fellow workers, such as workers at a restaurant (e.g., servers, bartenders, bussers, takeout workers, etc.) to share tips. The portal may provide user interfaces that access and display data with their credit card and cash sales and credit card tips, optionally in response to the workers closing out at the end of their shifts. The portal may optionally, using data from point of sales systems, automatically declare credit/debit card tips and enable workers to declare their cash tips (e.g., periodically or at the end of their shifts). Optionally, in order for a worker to access the portal, the worker may need to first clock in (e.g., via an electronic clock in terminal). As further disclosed herein, the portal may be configured to process cash payments and tips, enable cash tips to be shared, and enable such cash payments and tips to be declared for tax purposes (where whichever worker ultimately receives a tip amount, whether tipped directly or by another worker, has the tip declared for tax purposes). The portal may be referred to herein as a tip portal.

The portal enables such co-workers to tip out workers who often do not directly receive tips from customers (e.g., support workers who assist waiters in the chain of service (e.g., bartenders, food runners, service assistants, etc.)). For example, a waiter may share tips with a specific worker on an individual basis and/or may share tips with specified groups that provided service to the customer (e.g., using electronically transferred funds instead of cash).

If group-tipping is enabled on the portal, and a user (e.g., a serving worker) wants to make a tip out, the user enters into a portal user interface the total money amount they want to tip out to workers within a specific group (e.g., bartenders, food runners, waiter assistants, or other positions). Optionally, tip outs can be restricted to workers working a particular shift or set of shifts. For example, if a team member is only working one shift, optionally, the worker may only be permitted to tip out other workers that worked that same shift. However, if a worker is working the AM shift (e.g., 7 a.m. to 5 p.m.) and PM shift (e.g., 5 p.m. to 3 a.m.), the worker may be enabled to tip both selected AM and the PM groups. The portal then optionally may automatically divide (e.g., equal or based on hours worked) the tip out amount designated for the group among group members who worked that position during the corresponding shift.

Optionally, a complex "auto distribute" function is provided. The user may select the auto distribute function by activating a corresponding control. The auto distribute feature comprises an automatic mathematical calculator that accesses the amount of time (e.g., in second, minutes, and/or hours) a given tip recipient worked for a given shift from a corresponding data store, and will divide tips allocated to all groups for a given shift on a pro rata basis based on the total time worked by all workers in a given group during that shift.

For example, if members of the food runner group collectively worked 50 hours on the AM shift, and if the tip out total is $50 to the food runner group, the "auto distribute" feature may calculate the tip out at $1 per hour worked, and a food runner group member who worked 5 hours would be automatically allocated a $5.00 tip out. Optionally, a user making a tip out can specify the exact currency amount that is to be allocated to each worker in a designated group. Optionally, the user may utilize the auto-distribute function to have the portal calculate the tips and present, for each group member for the shift at issue, how much each group member will receive, where the name of each group member and the corresponding tip out amount are presented together. An edit control may be provided via which the user may edit, on a group member by group member basis, the calculated amounts so as to replace a calculated amount with a user-specified amount.

If a group member is working during multiple shifts (e.g., is working hours that fall across both an AM shift and a PM shift) for a given day, the group member may be allocated tip outs for both shifts for that day.

If a given worker does not complete the cash out process for a given shift on a given day, a user interface shift selection control (e.g., an AM/PM toggle control) may be provided by the portal via which the worker can select which shift they want to tip out. Optionally, the shift selection control is automatically displayed when a worker is accessing the corresponding tip out user interface in accordance with a predetermined schedule (e.g., 4 p.m. to 3 a.m.). Optionally, if a worker is working across multiple shifts and wants to tip out both shifts (e.g., both an AM shift and a PM shift), the worker may select the desired group to receive a tip out twice (once for each shift). Optionally, if the worker has selected a given group for a first shift (e.g., the AM shift), the portal may automatically select the same given group for a second shift (e.g., the PM shift).

Optionally, if members of different groups specify tip outs for a given shift, the tips may be aggregated by the portal so that the recipients receive a single larger tip out deposit to their financial accounts and/or instruments rather than receiving multiple smaller tip outs from each tip out provided, thereby reducing the number of transactions needed with financial systems, and correspondingly decreasing the amount of network, processor, and memory resources needed, thereby addressing the technical challenge of ensuring there are adequate computer-related resources available.

Optionally, a group/worker may perform the closeout for the entire group/team being tipped out, thereby reducing the number of terminals and terminal interactions needed to perform a close out. Optionally, such a worker may be authorized to perform the closeout and other workers are inhibited by the portal from performing the closeout. Optionally, if the closing worker fails to perform the close out (e.g., forgets to perform the closeout) by a certain time threshold, other workers may be enabled to distribute the tip out on their next shift. Optionally, a worker may only be enabled to perform a tip out for a team if they clocked in under the job/team code for which the worker wants to distribute such tip funds, thereby enhancing security.

Optionally, a worker may be enabled, via a corresponding control, to add herself/himself to a given group/team (e.g., by selecting an "Add Group Member" control). Optionally, only an authorized user (e.g., a fellow-group/worker) may be authorized to enter, for each group member for a given shift, the number of hours worked by that member (e.g., to enable such workers to receive tips outs for the shift). Optionally, the entered hours may be verified by the portal (or manually) based on hours accessed from a time punch-in clock (which may include a mechanical punch in mechanism, an application on a POS or other terminal, and/or the like). A worker may punch in via a card, by entering a code specific to them, by placing a finger on a punch clock fingerprint reader (which may then use the fingerprint to identify the user from a fingerprint record data store, and store the user's identify with the corresponding punch in time), or by using other techniques (e.g., a facial image recognition system).

If multiple workers are working together, the portal may access and display the credit card tips (and optionally cash tips) each worker received (e.g., based on sales they completed). If workers want to share those tips, each worker can tip out the group (including the closer), and the tip outs may be calculated for a given worker by dividing the total tips by hours worked (or the tips may be manually distributed). As described herein, tips may be directly deposited into the corresponding worker accounts or financial instruments, or tips can be assigned to the group and then divided among group members (e.g., based on the hours the group members worked during the corresponding shift).

The portal may provide a history user interface that accesses and display a history of funds (e.g., tips and tip outs) deposited in a worker's account and/or added to a financial instrument (e.g., a payroll account or prepaid debit card, such as a pay card). Optionally, a filter control may be provided via which the worker may command the portal to display a filtered set of historical data (e.g., for a specified time period, such as the current week, the current month, a previous month, the last year, etc.), and the data may be filtered and displayed accordingly.

The tip portal may be configured to automatically declare tip outs received by workers (e.g., bartenders, food runners, and service assistants for tax purposes) and automatically remove those tips from the taxable tip declarations of the worker who tipped them out (shared their tips).

As similarly discussed above, the tip portal may be configured to load certain types of electronic tips and tip outs (e.g., credit/debit card tips) into financial accounts and/or onto financial instruments (e.g., prepaid debit cards) of tipped workers. Optionally, a worker that receives a cash tip may simply keep the cash tip after declaring it in the portal.

Advantageously, because use of the portal reduces the amount of cash that a worker carries when leaving an establishment, the workers, as well as of the tips, are more secure. Further, because some or all of the tips and tip outs received by a worker may be automatically declared by the portal for the purposes of taxation (e.g., income tax, social security and other payroll tax, and/or other taxes), fewer errors are likely to occur, ensuring data integrity and compliance with relevant regulations and law. Such tips may be automatically included in a worker's wage and tax statement (e.g., the IRS W-2), which may be printed out and/or electronically provided to the worker and optionally a relevant taxing authority. Advantageously, because such wage and tax statements are often important factors considered by lending institutions in determining whether to grant a person a loan and by landlords in determining whether to accept a person as a renter, by accurately and more completely including a worker's tips on such wage and tax statements, the worker is more likely to be granted a loan or be approved as a renter.

Further, as described herein, the portal enables quicker, more accurate, tips outs, thereby making it more likely that workers will utilize the portal and providing for more secure, accurate, and faster allocation of tips outs workers who assisted in the chain of service, including workers who may have left the establishment prior to the customer's check being closed. For example, tips may be added to a given financial instrument or account of a worker the same day the worker's shift ended or provided a command via the portal, and often within about 60 minutes. Optionally, the addition of tips to a given financial instrument or account of a worker may be performed in substantially real time (e.g., 1 to 30 seconds). Optionally, the allocation of tips and/or tip outs may be triggered in response to a worker (who may be referred to as a user) closing out customer checks, running a cash-out report, and/or declaring cash tips and specifying tip-outs (and activating a save or execution control).

Optionally, if a worker works two shifts in a given time period (e.g., the same working day), the portal may require that the worker separately close out checks and run a cash out report for each shift. Optionally, if the worker only performs a close out and cash out for one of the two shifts, the portal will inhibit the allocation of tips to the worker's financial account or instrument from one of the two shifts (e.g., the shift they didn't close out and declare tips).

Optionally, a worker may be prevented from declaring cash tips and/or providing tip outs for a shift until the portal determines that the worker has closed out all of the checks handled by the worker for the current shift and/or has run a worker cash out report. Optionally, the portal will enable the worker to enter sales, tips, and tip outs prior to closing out all checks and cash outs.

Optionally, a record of tips and tips outs may be used to populate a corresponding notification which may in turn be transmitted to the worker in substantially real time and/or presented to the worker (e.g., via an application installed on a worker device, via an HTML or other document presented by an establishment or other terminal via the portal).

Optionally, once a worker finalizes and submits cash tip declarations and/or once the worker leaves the establishment premises (e.g., as determined from the worker punching out via a mechanical or electrical device), the worker may be inhibited from modifying the worker's declarations and/or tip outs for the corresponding shift worked by the worker. Optionally, a worker may request from another worker with sufficient authorization to make such edits (e.g., via the portal or otherwise), and if the other worker submits an edit authorization via the portal, the worker may be enabled to make tip declaration and/or tip out edits, which may then be received, stored, and/or executed via the portal.

Still further, use of the portal and its tip out tracking functionality inhibits funds that have been tipped out by a worker to another worker from being inaccurately being included in the taxable income of the worker.

FIG. 1 illustrates an example architecture and environment. An establishment 101 (e.g., a restaurant, hotel, etc.) may have one or more point of sale system (POS) terminals 106-1, 106-2, 106-N. A given point of sale terminal may include one or more credit/debit card readers, NFC (near field communication) readers, QR code readers, a networked cash register, portable wireless tablet, and/or the like. The POS terminal 106 may be utilized to receive customer orders for goods and services (e.g., directly entered by the customer or by a waiter or other worker), and receive a customer 104 payment for goods and services (e.g., using a user device, such as a phone or watch) with an embedded NFC circuit where payment may be made by tapping the user device against an NFC reader, by capturing an image of a QR code displayed on the user device).

Optionally, a user device may be used as a POS terminal 106 to wirelessly make a payment for goods and services (e.g., food and tips). Optionally, the POS terminal 106 may include a field and associated controls via which a user (e.g., a customer, server, cashier) can enter customer-specified amounts, such as a tip. Optionally, the POS terminal 106 or system 101 may automatically credit the tip to a worker, such as a server that served the customer.

The establishment may have one or more customer locations (e.g., tables, bar seats, movie seats) to which such goods and services may be provided, where a given location may be associated with one or more establishment workers or groups of workers (waiters, waiter assistants, etc.).

The establishment system 101 may be physically local to the establishment or may be physically remote from the establishment. Optionally, the system 101 may comprise a hosted computing environment that includes a collection of physical computing resources that may be remotely accessible and may be rapidly provisioned as needed (sometimes referred to as a "cloud" computing environment). The system 101 may also include a data store. The data store is optionally a hosted storage environment that includes a collection of physical data storage devices that may be remotely accessible and may be rapidly provisioned as needed (sometimes referred to as "cloud" storage). The establishment system 101 may be utilized by multiple establishments (e.g., that are owned or run by the same merchant or that are franchises of the same chain).

The system 101 may communicate with the POS 106 terminals and a payment gateway 108. The payment gateway 108 may be used in the execution of a payment transaction by the transfer of information between a payment portal (such as the POS systems described herein) and a front end processor or acquiring financial institution (e.g., bank).

The POS terminals 106 may encrypt information transmitted to the system 101. For example, the POS terminals 106 may utilize tokenization where personal card data may be replaced with a tokenized number so that sensitive data is not exposed during the authentication process. For example, instead of a financial instrument number (e.g., a credit or debit card account number), a randomized number (e.g., a 16 digit number sharing the last 4 digits of a credit or debit card number) is generated while the real account number is stored in a secure token vault. Optionally, communication between the various disclosed systems and devices may utilize public-private key encryption, where for example, the sender uses its private key and the receiver's public keys to encrypt payment information before transmitting the payment information to the recipient. The recipient of the payment information may use its private key and the sender's public key to decrypt the received information. This encryption process optionally utilizes digital signatures in public certificates to verify the sender of the information.

Optionally, where payment information is transmitted from a POS terminal browser to the system 101, the browser may utilize SSL (Secure Socket Layer) encryption.

Once the system 101 receives transaction data (e.g., payment (and tip) amounts and a financial instrument identifier to be used to make the payment) from the POS terminal 106, the system 101 may transmit some or all of the transaction data in a message to the payment gateway 108 (e.g., using an SSL encrypted connection to a payment server hosted by the payment gateway).

Optionally, the payment gateway 108 may convert the message to ISO 8583 compatible message or other format understood by electronic fund transfer switches) and may then forward the message including the transaction data to a payment processor used by establishment's acquiring bank 110.

The payment processor of the acquiring bank 110 may then transmit the transaction data to a card association system 112 (e.g., VISA, MASTERCARD, DISCOVER, AMERICAN EXPRESS, etc.). In certain situations, the card association may also act as the issuing bank and its system 112 may also act as the issuing bank system 114. In such a case, the card association may directly provide a response of approved or declined to the payment gateway 108. In other situations, the card association system 112 may transmit the transaction data to the corresponding issuing bank system (card issuing bank system) 114.

The issuing bank system 114 receives the authorization request, verifies the available credit or debit amounts and transmits a response back to the payment processor with a response code (e.g., denied, approved, or the like), and where the response code indicates "denied", the response code may also indicate the denial cause (e.g., insufficient funds). The payment processor transmits the authorization response to the payment gateway 108, which in turn may transmit the authorization response to the system 101, and from system 101 to the POS terminal 106 for presentation to the POS terminal 106 operator (e.g., cashier, server, customer, etc.). The system 101 may then transmit a message to the issuing bank system 114 to clear the transaction, which in turn may move the transaction from an authorization hold state to a debit state, and settle the transaction with the acquiring bank 110. The acquiring bank 110 may make a settlement request of the credit card issuer, which in turn may make a settlement payment to the acquiring bank 110.

The acquiring bank 110 may then deposit the total of the approved funds into the establishment's nominated account (e.g., an account with the acquiring bank if the establishment does its banking with the same bank, or an account with another banking institution).

Optionally, the payment gateway 108 may include tools to automatically screen purchase requests for fraud (e.g., utilizing geolocation data, velocity pattern analysis, Office of Foreign Assets Control list lookups, blacklist lookups, computer fingerprinting, identity morphing detection, and address verification service checks, and/or the like) and calculate tax in real time prior to the authorization request being sent to the payment processor.

Figure 2:
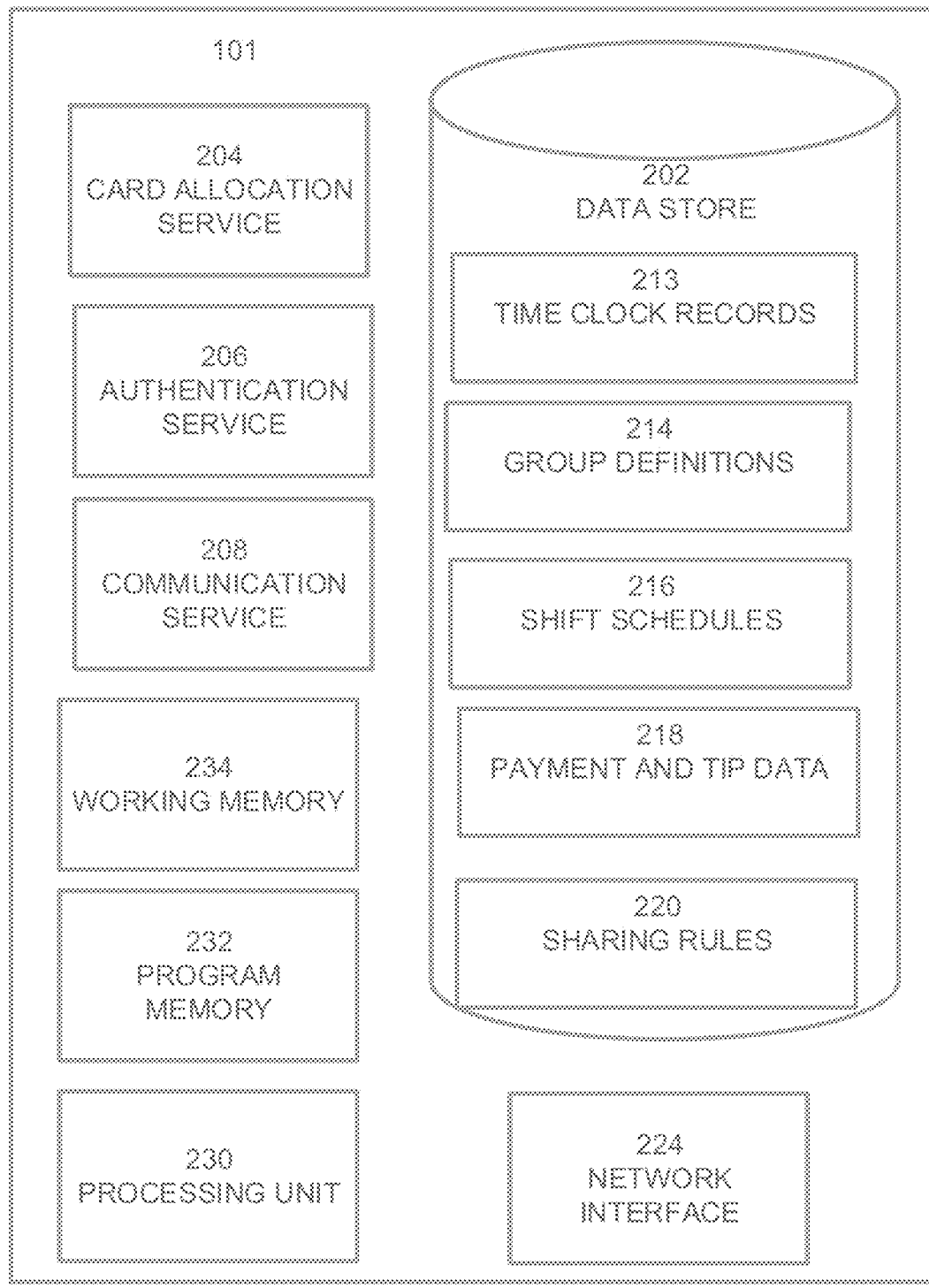
FIG. 2 illustrates an example system architecture.

FIG. 2 illustrates an example establishment system 101 architecture configured to provide portal services disclosed herein (e.g., process the sharing of credit card and cash tips). A network interface 224 enables the system 101 to communicate with other systems and devices, such as point of sales devices 106, payment gateway 108, acquiring bank/processor 110, the card association system 112, and/or issuing bank system 114. The system 101 may include one or more processing units 230 (which may include one or more processing devices, such as CPUs), program memory 232 (e.g., EEPROM, magnetic hard drive, optical drive, etc.) configured to store programs that are executable by the processing unit 230 to perform operations described herein, working memory 234 (which may be in the form of a type of RAM, such as DRAM (e.g., Synchronous Dynamic RAM (SDRAM)), and a non-volatile data store (e.g., a magnetic, optical, and/or solid state data store) 202 that hosts one or more databases.

For example, the data store 202 may store time clock records 213 (e.g., records of when a worker/service person checked in to work, indicating a work start time, and checked out of work, indicating a work end time), group definitions 214 (e.g., members of groups such as "servers", "server assistant", "bartenders", etc.). The data store 202 may also store shift schedules 216 that indicate on what days and/or at what times a given member will be working at the establishment (e.g., a specific time range, or a shift specified, such as morning, afternoon, evening, etc.). The data store 202 may store payment and tip data (e.g., purchase amounts for item and/or service purchases, associated tip data, and an identification of the worker(s) to whom the tip is allocated). The data store 202 may also store sharing rules 220 (e.g., tip out rules) specified by a worker, such as described elsewhere herein (e.g., that specify amounts to be shared with specified individuals and/or groups during a given time period).

Certain example user interfaces will now be described in greater detail. The user interfaces are configured to display data in an efficient manner and organized so as to reduce the need for large displays. Further, the example user interfaces are configured to reduce the amount of navigation needed among user interfaces. Thus, certain user interfaces may be optimized for the relatively small displays of hand held computer devices, such as smart phones and tablet computers.

In order for users to access some or all of the user interfaces, a user may first need to be authenticated by the system. Authentication may be performed using biometric authentication (e.g., fingerprint authentication, facial recognition authentication, voice print authentication), user device authentication (e.g., using Hardware Root of Trust (on-chip security functions including key generation, integrity checks and/or attestation), Trusted Execution Environment (TEE), two-factor authentication (where a one-time password (OTP) may be generated and transmitted by the system to a user device, such as a user phone or wearable, and where the user needs to enter the OTP into a password field), and/or via a user identifier and user generated password.

Figure 3A:
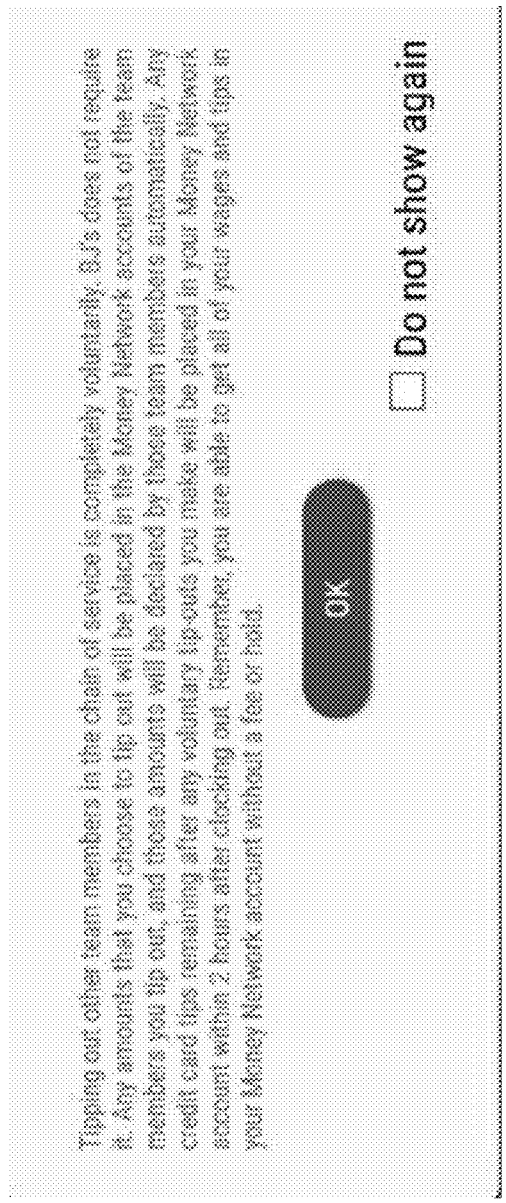
FIGS. 3A-3Q illustrate example user interfaces.

Referring now to FIG. 3A, a user interface instructs a user (e.g., a service provider such as a waiter or valet) that the user is not required to share customer-specified amounts designated for the user.

Figure 3B:
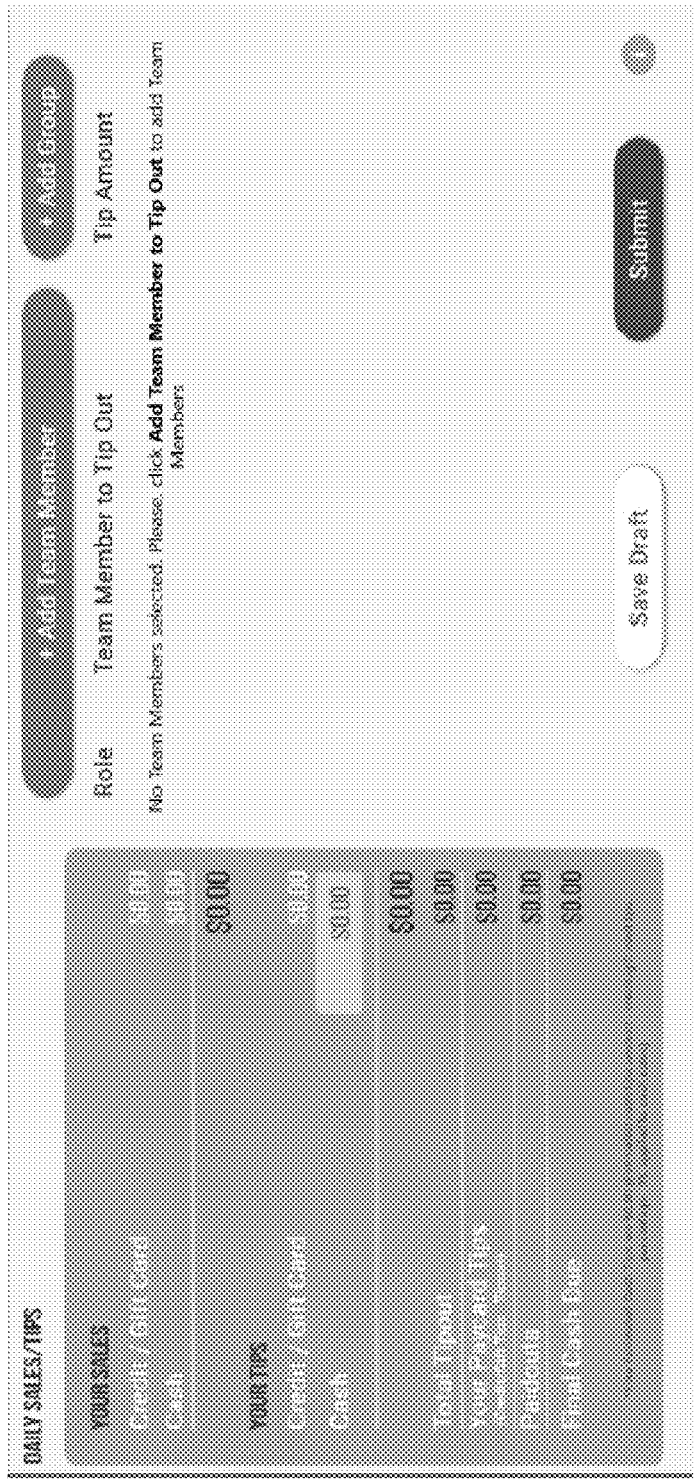

Referring to FIG. 3B, an example user interface is illustrated that enables the user to add other workers or groups to receive a portion of a customer-specified amount. A control may be provided via which the user can specify an amount to be allocated to groups or workers. A control may be provided via which the user may indicate that the user's worker definition, group definition, and tip amount may be saved as a draft (where user-specified amounts will not yet be shared in accordance with the specification), or whether the specification should be applied (optionally in real time).

FIG. 3B may also include a dashboard that provides an overview of certain activities and amounts associated with the user. For example, the information may optionally be calculated and displayed in real time from data accessed from one or more one or more data stores and/or from one or more point of sale terminals. The information may be limited to activities that occurred over a predetermined time frame (e.g., the current shift, the current day, the current week, the current month, etc.), a time frame and/or shifts specified by the user, and/or since inception of a user account.

In the illustrated example, the information may be related to sales and tips associated with the user (e.g., provided by a customer for food and beverages purchased at an eating establishment). For example, aggregate sales for the specified time or shift by the user may be reported. Optionally, the sale amounts reported may be broken down by payment instrument type used to make the purchase (e.g., credit card/debit card/gift card, cash, cryptocurrency, etc.). In addition, the amount of customer specified amounts assigned to the user (e.g., tips) may be reported. Optionally, the customer specified amounts assigned to the user, broken down by payment instrument type used to make the purchase (e.g., credit card/debit card/gift card, cash, cryptocurrency, etc.), may be reported.

Optionally, the total tip outs (the amount or percentage of the user's tips that the user shares) may be reported, The user's pay account or pay card tips, amount paid out, and final amount (e.g., cash due) may be reported.

Figure 3C:
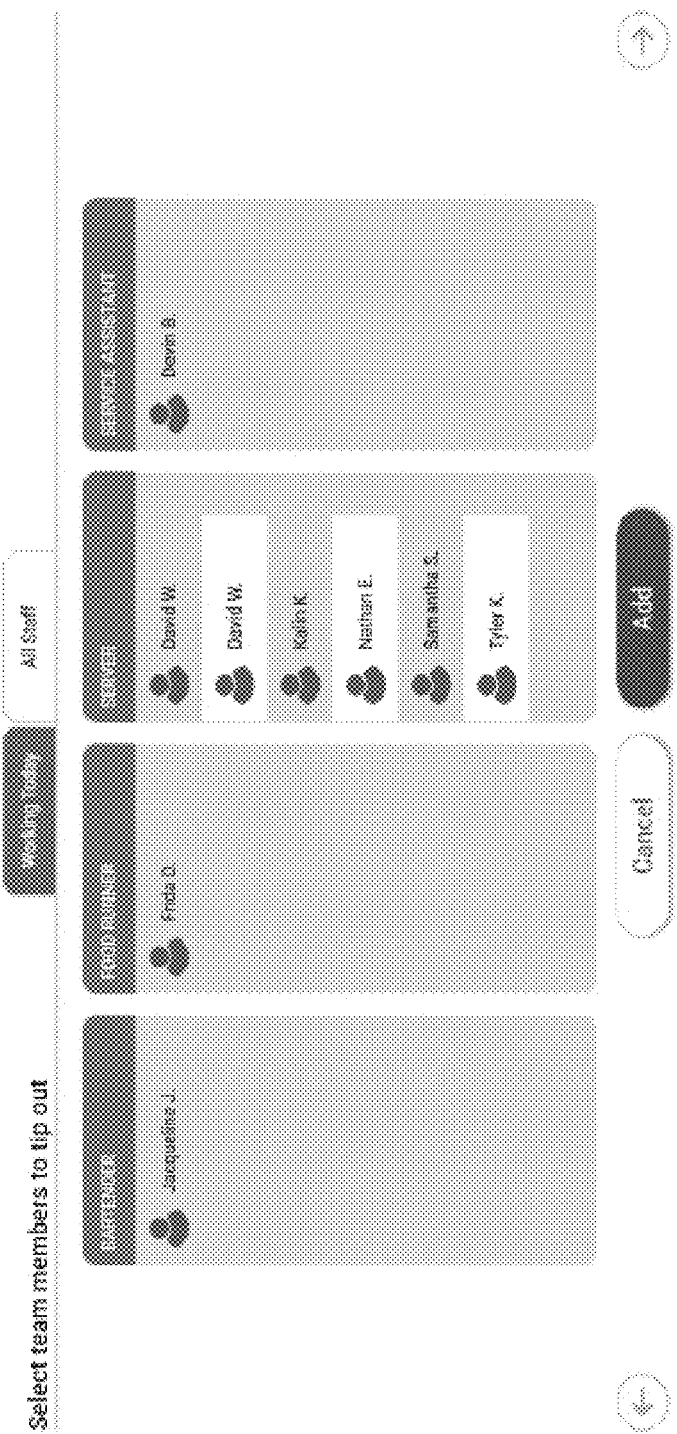

Referring to FIG. 3C, user interfaces are illustrated that enable a user to select workers from different groups/teams/positions with whom the user wants to share portions of tips (a "tip out"). The selection may be for a given time period (e.g., a current or specified shift, day, week, etc., such as the "current day"). In response to the user activating a "working today" control, the user interface may be dynamically generated using data accessed from a data store that indicates which workers (which may include contractors) are scheduled or checked in to work the current shift and/or day at the user's establishment, and the workers' titles/job type (e.g., bartender, food runner, server, service assistant, etc.). The user may select one or more of the listed workers who are eligible to receive a tip and activate an "add" control to add the selected workers to the user's tip out-set.

Figure 3D:
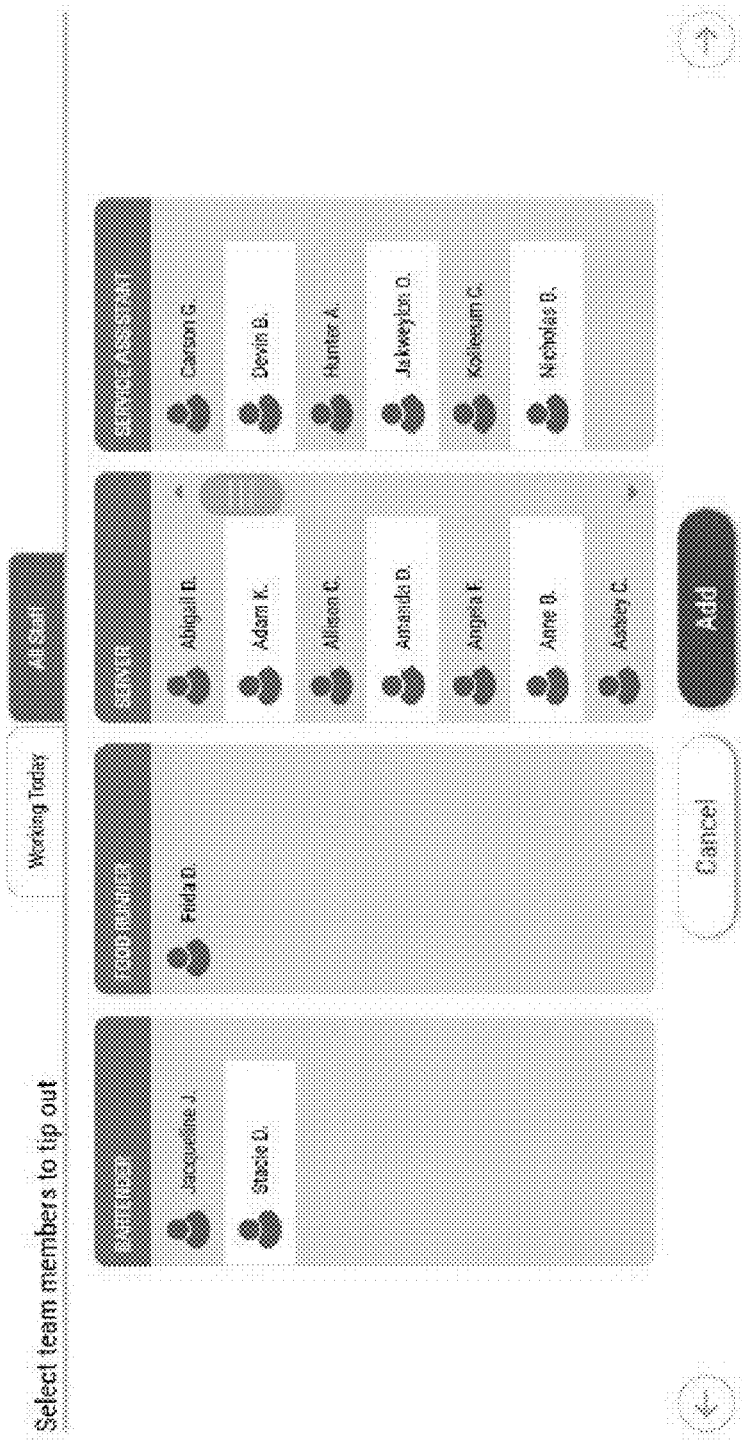

If the user selects the "all staff" tab illustrated in FIG. 3C, referring to FIG. 3D, the illustrated user interfaces may be presented that enable a user to select workers with whom the user wants to share portions of tips (a "tip out"), regardless of time period. In response to the user activating the "all staff" control, the user interface may be dynamically generated using data accessed from a data store that indicates all workers (which may include contractors) currently employed at the user's establishment, and the workers' titles/job type (e.g., bartender, food runner, server, service assistant, etc.). The user may select one or more of the listed workers who are to receive a tip and activate an "add" control to add the selected workers to the user's tip out-set.

Figure 3E:
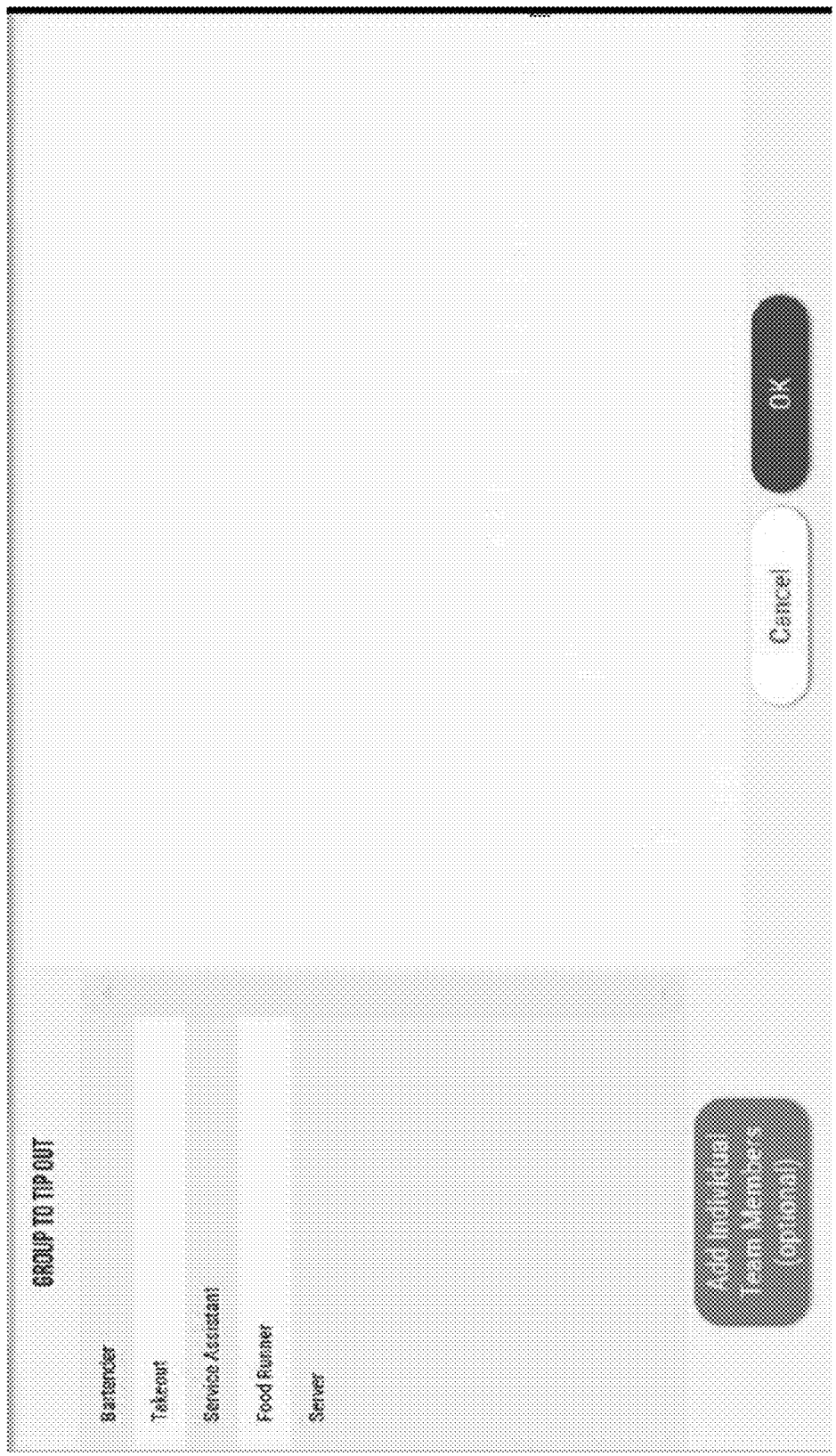

Referring to FIG. 3E, a user interface is illustrated that enables a user to specify which groups/positions/teams are to share tip outs from the user (where, optionally, each member of a given group will receive an equal portion of the tip out designated for the group). The selection may be for a given time period (e.g., the current day, the current week etc.). The group may be organized by job function (e.g., bartender, takeout, service assistant, food runner, server, etc.). Optionally, a control may be provided that enables the user to add individual members from a team/group as a tip out recipient.

Figure 3F:
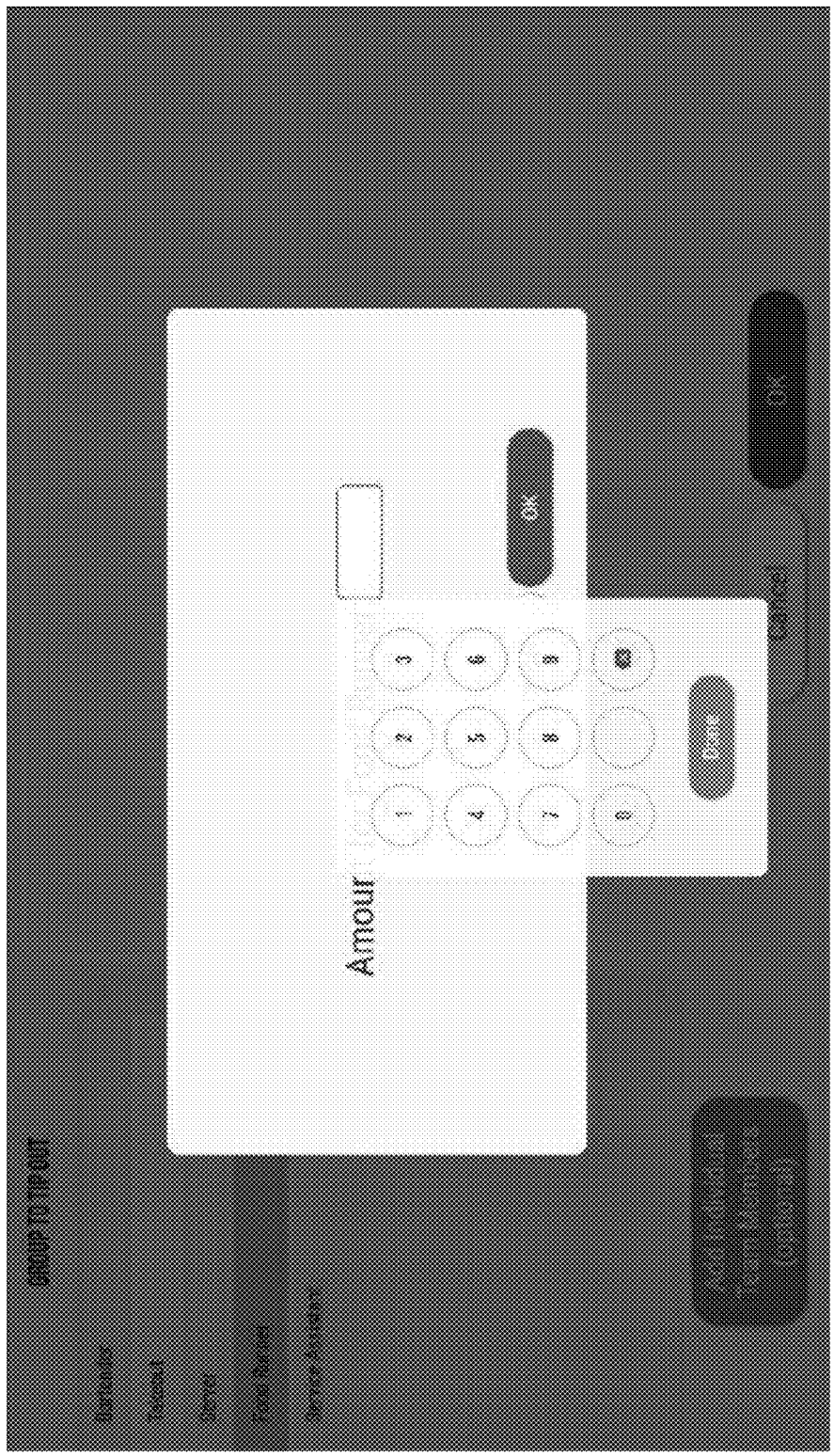

FIG. 3F illustrates a user interface via which the user may specify a tip out amount to be provided to a selected group. The selection may be for a given time period (e.g., the current day, the current week etc.). Optionally, a pop-up keyboard may be provided via which the user may enter the tip out amount (e.g., as a fixed currency amount or as a percentage).

Figure 3G:
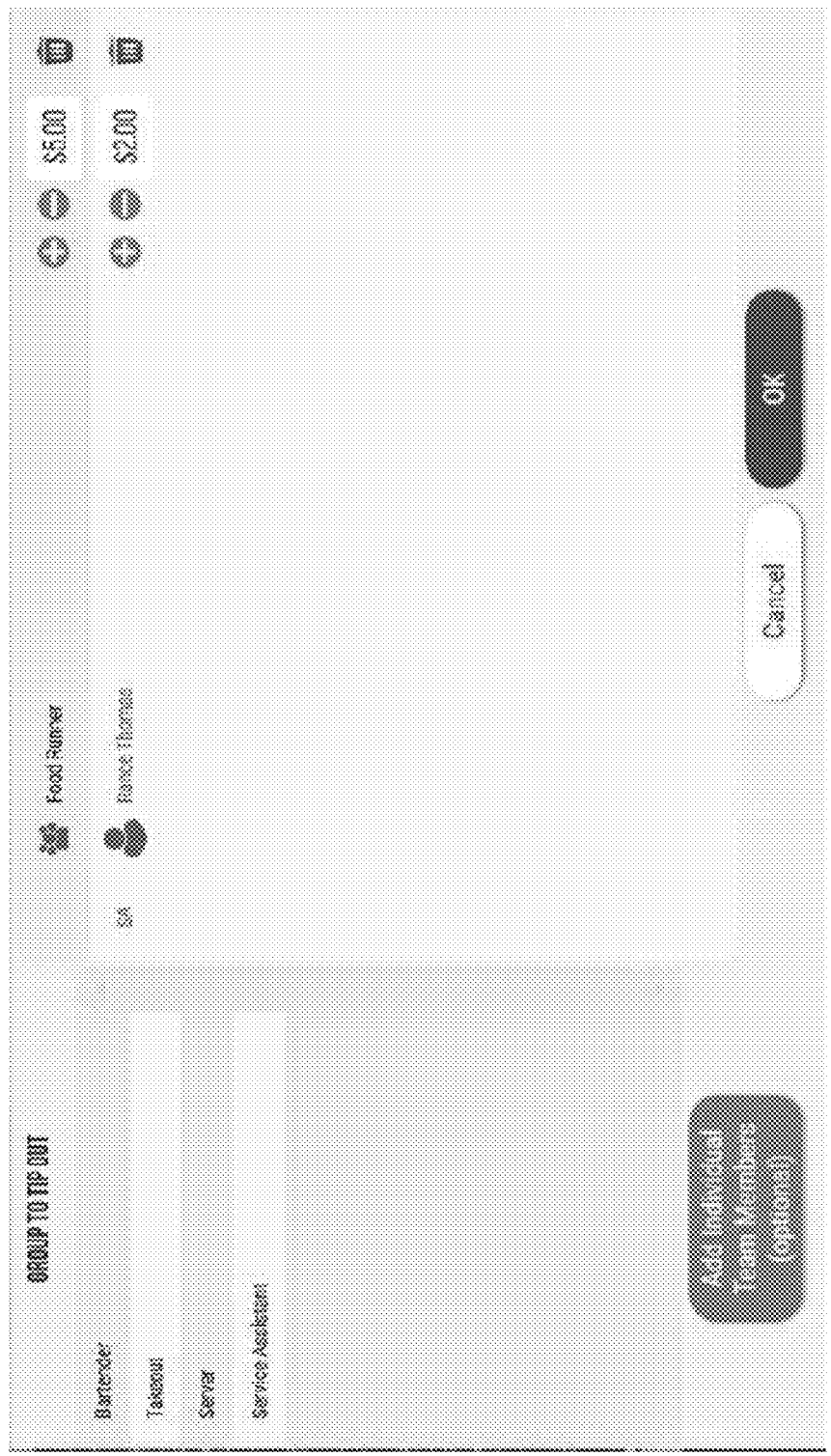

FIG. 3G illustrates a user interface that lists each group and individual the user has allocated a tip out amount to and the tip out amount. The selection may be for a given time period (e.g., the current shift, the current day, the current week etc.). A "+" control and a "−" control may be displayed in association with an allocated tip out amount which, when activated, respectively enable the user to increase or decrease the tip out amount. A trash icon is presented that, when activated, causes the tip out amount and/or group/individual to be deleted. Controls may be provided via which the user can add additional groups and/or individuals as tip out recipients. Optionally, an interface may be provided that enables certain positions to be included or excluded from receiving tips (e.g., to prevent certain workers serving in certain positions from receiving tip outs, such as those positions that are legally prohibited from receiving such tip outs).

Figure 3H:

FIG. 3H illustrates a user interface that enables a tip out specification to be submitted by the user so that the specified tip outs are executed and the various specified recipients receive their corresponding tip outs. The user interface may be presented after the user has added groups and/or individuals to the user's designated set of tip out recipients using the previously described user interfaces. The user interface lists each group and individual the user has allocated a tip out amount to and the tip out amount. Optionally, instead, the user may activate a save draft control provided by the user interface so that the specification is saved for later editing or execution. A trash icon may be presented in association with a corresponding tip out amount that, when activated, causes the tip out amount and/or group/individual to be deleted. As similarly discussed above, a dashboard may be presented related to sales and tips associated with the user (e.g., for food and beverages purchased at an eating establishment). For example, aggregate sales for the user specified time may be reported. Optionally, the sale amounts reported may be broken down by payment instrument type used to make the purchase (e.g., credit card/debit card/gift card, cash, cryptocurrency, etc.). In addition, the amount of customer-specified amounts assigned to the user (e.g., tips) may be reported. Optionally, the customer-specified amounts assigned to the user, broken down by payment instrument type used to make the purchase (e.g., credit card/debit card/gift card, cash, cryptocurrency, etc.), may be reported.

Figure 3I:
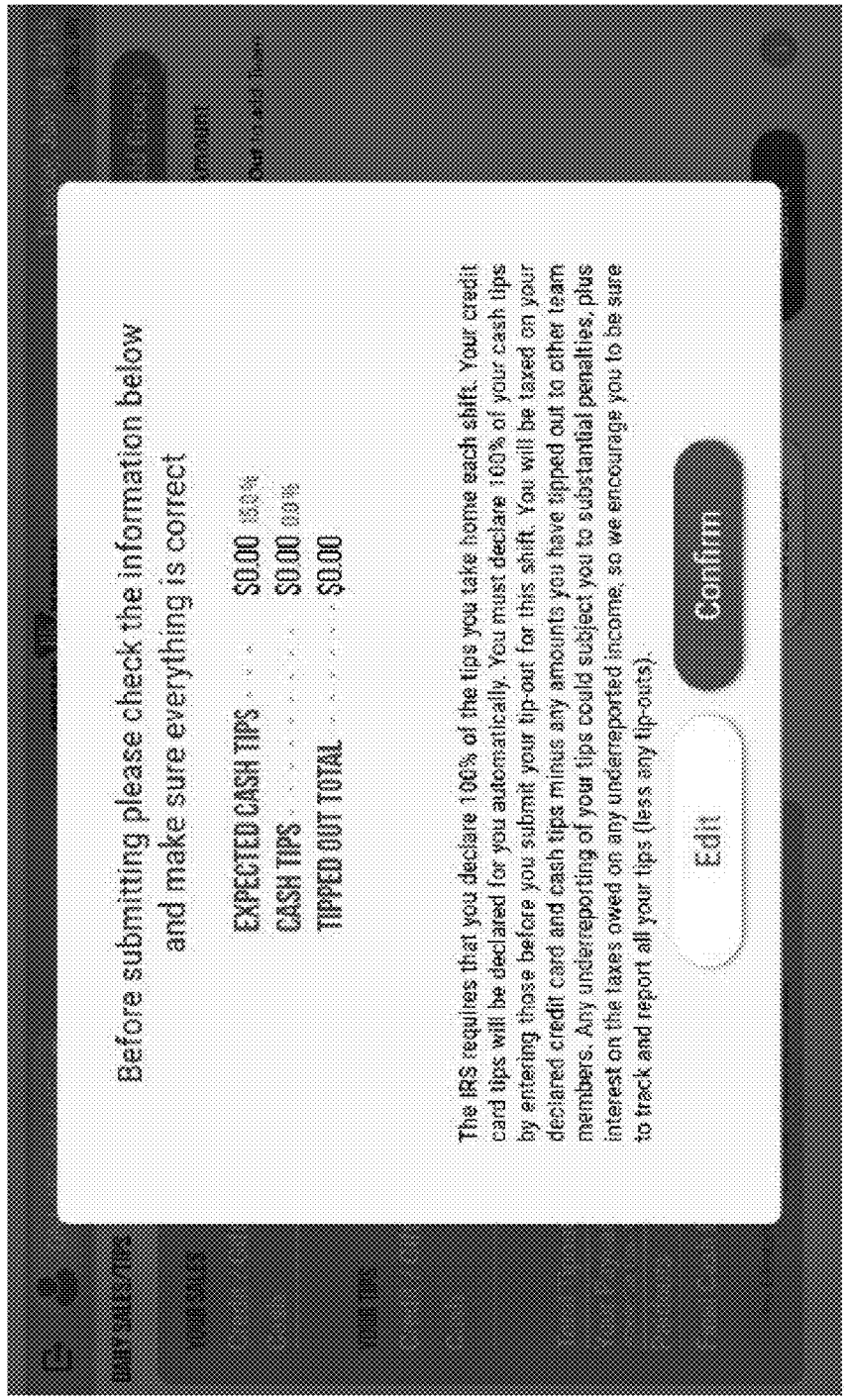
Figure 3J:
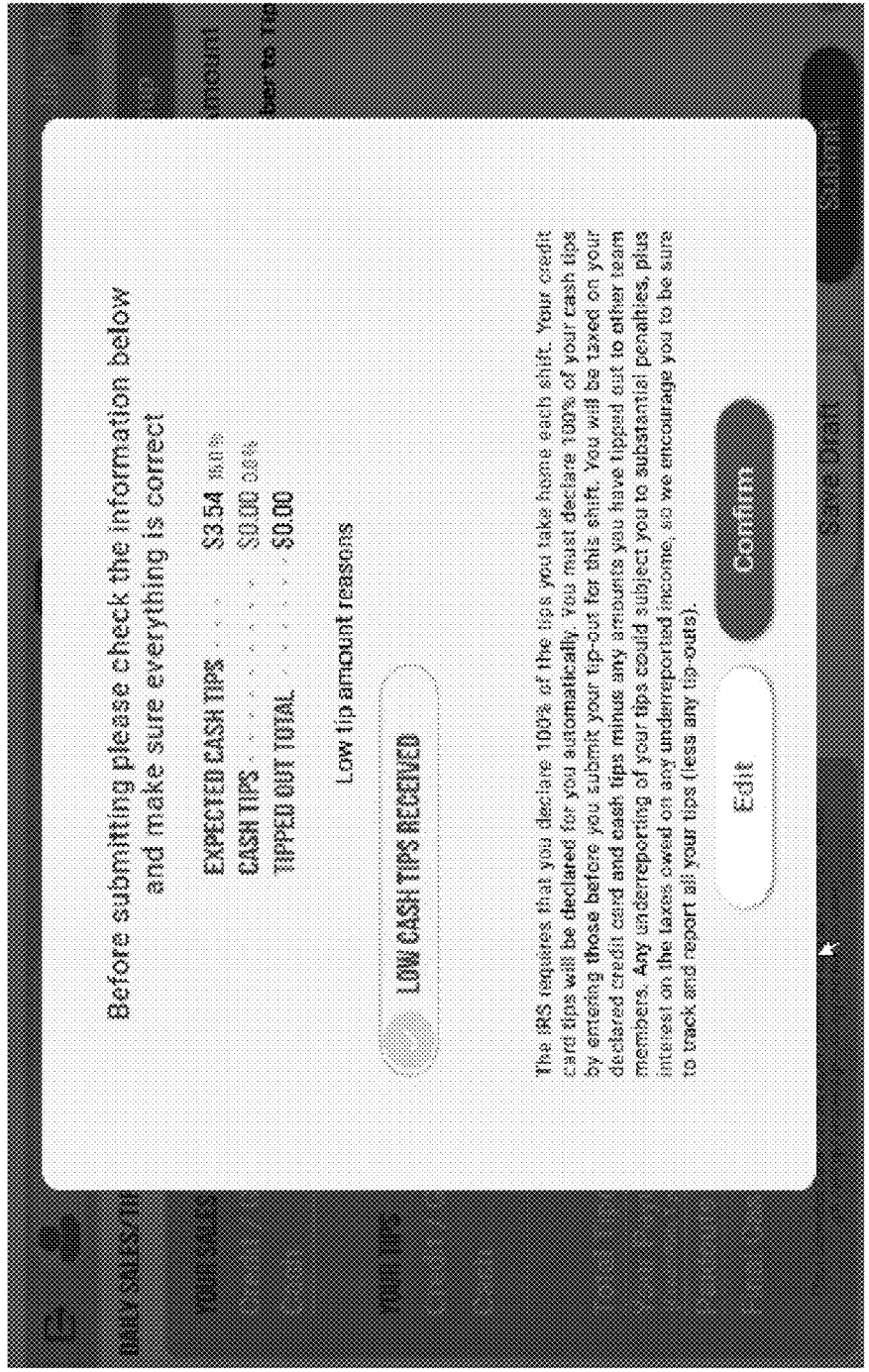
Figure 3K:
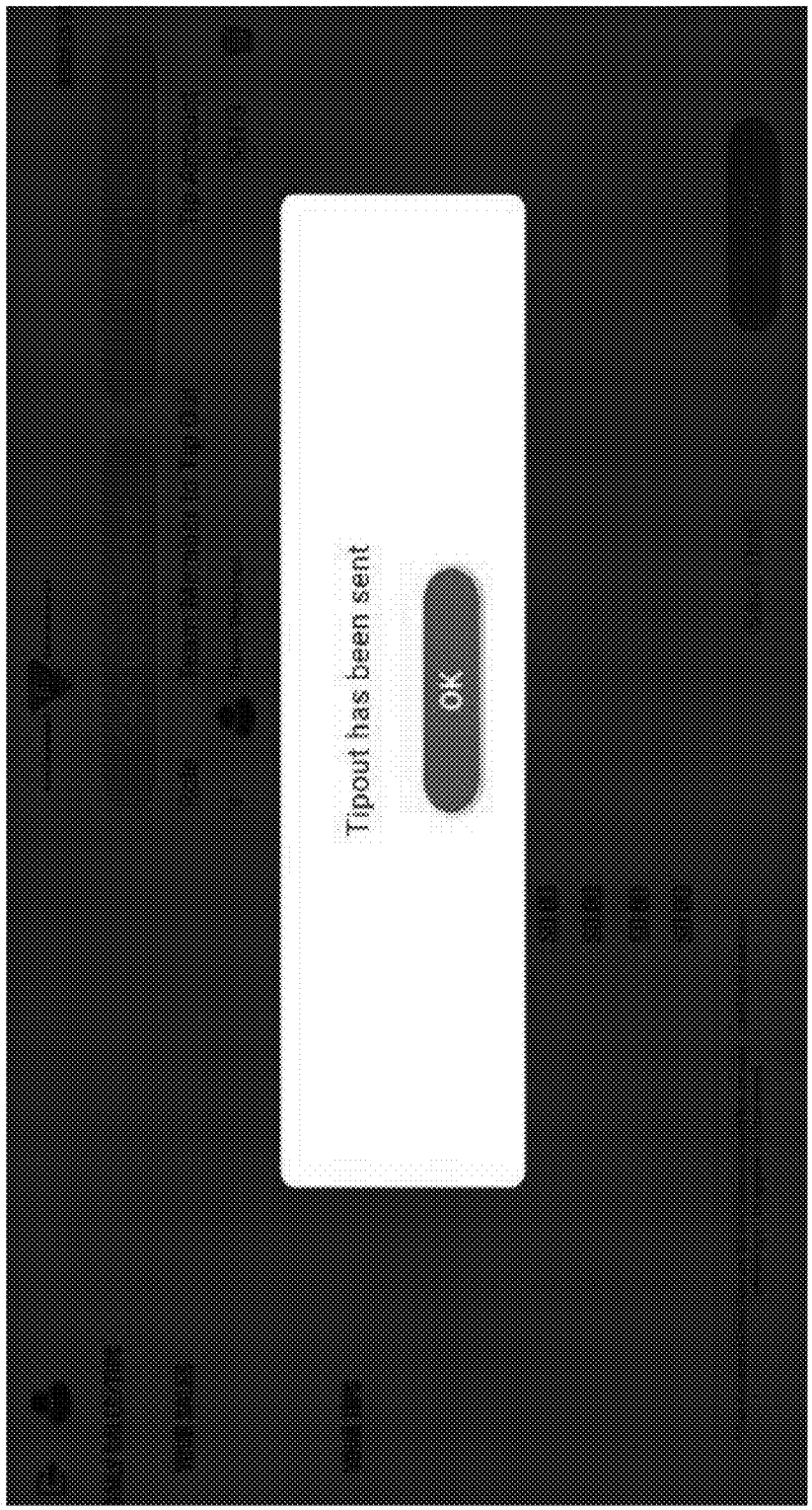
Figure 3L:
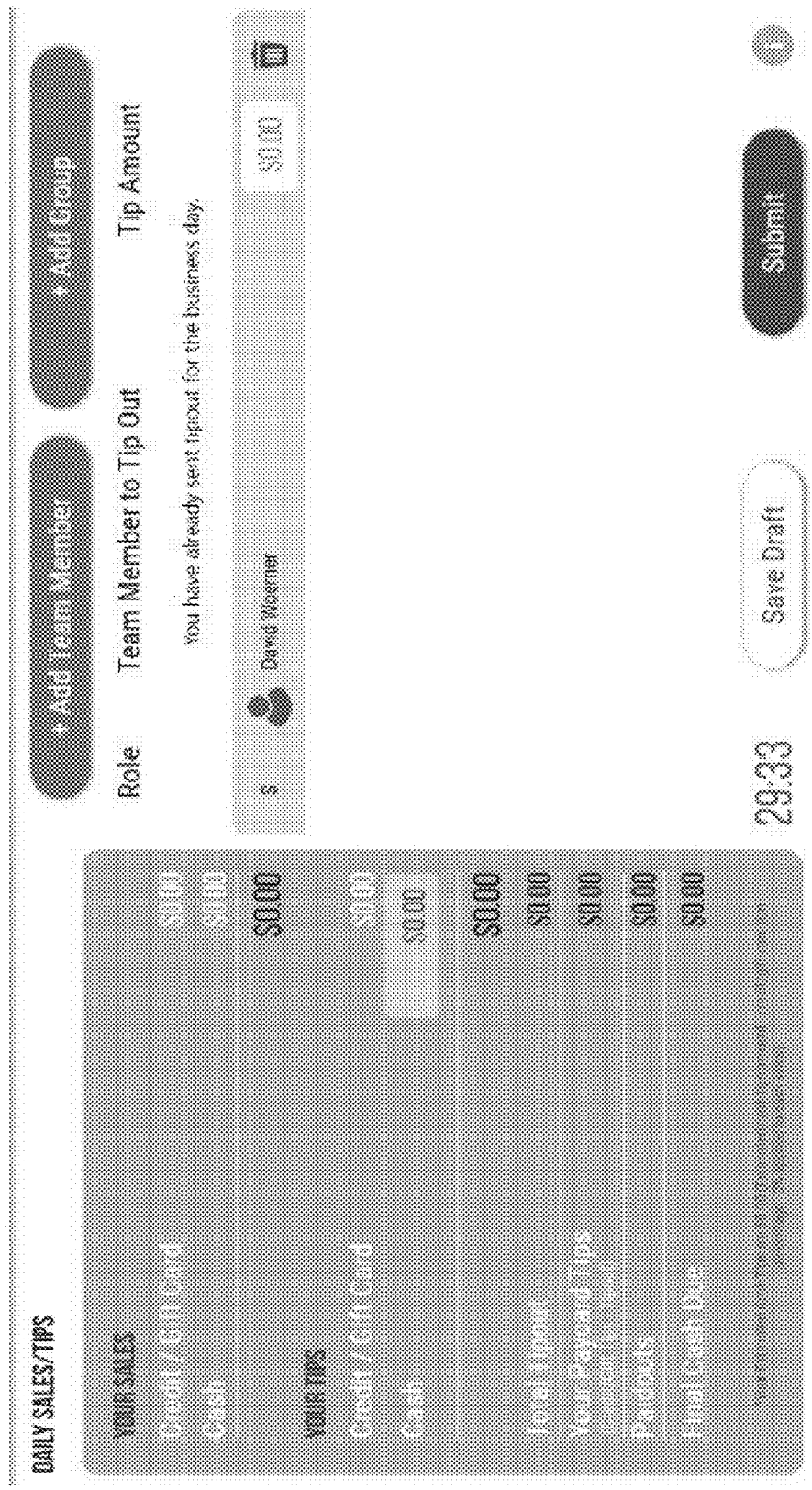

If the user activates the submit control, the user interface illustrated in FIG. 3L may be presented (which may include the information discussed above with respect to FIG. 3H). The system may initiate a timer in response to the activation of the submit control which enables the user to edit the tip out specification for a time period corresponding to the timer (e.g., 15 minutes, 30 minutes, 60 minutes, 24 hours, or other time frame). The user interface may display a corresponding count down timer to let the user know how much time the user has left to edit the tip out specification. Optionally, the tip out is not assigned to a recipient until a scheduled time of day or time range, or a specified period of time after the end of a specified work shift.

Referring to FIG. 3I, an example user interface is presented that may be displayed after the user activates the submit control illustrated in FIG. 3H. The user interface may be utilized with respect to declaring tips for tax purposes. For example, optionally the system may automatically declare tips (where such declaration may be submitted to the Internal Revenue Service, a state taxing authority, a city taxing authority, and/or other relevant taxing authority). However, optionally, the user may be requested to manually declare tips that were received by the user in the form of cash. The user interface may present expected cash tips for the user for the corresponding specified time period. Optionally, the tip out amounts are not be automatically included in the user tax declaration (although optionally such tip outs may be automatically or manually declared for or by the tip out recipients).

The user interface illustrated in FIG. 3I may include expected cash tips for a specified time period (e.g., the current day, week, month, etc.). The expected cash tips may be calculated based on historical sales for the user and/or for the tables/areas the user is designated to serve for the corresponding time period. In addition, the expected cash tips may be calculated based on a specified expected average or median tip percentage. The average or median tip percentage may be calculated using historical tip percentages received by the user specifically or a server group (of which the user is a member), where such historical tip percentage data may be calculated using historical data accessed from a data store. Optionally, the tip percentage may be manually specified by the user or other authorized person.

In addition, the actual aggregate cash tips designated for the user may be calculated from tip data accessed from a data store presented. The actual aggregate cash tips received by the user for the corresponding time period may be displayed. Optionally, the actual aggregate cash tips for the corresponding time period may be manually entered by the user. The actual aggregate cash tips as a percentage of sales made by the user may be calculated and displayed, thereby enabling the user to view both the expected tip percentage and the actual tip percentage at the same time. Optionally, tip-related tax information and instructions may be presented via the user interface.

If the system detects that the user is declaring a cash tip amount that is less than the expected amount, a warning, such as that illustrated in FIG. 3J, may be generated and presented. The warning may indicate that the specified cash tip amount is lower than the expected cash tip amount and may prompt the user to either edit the cash tip amount (by activating a displayed edit control) or to confirm the specified cash tip amount (by activating a displayed confirm control). If the user activates the confirm control, the user interface illustrated in FIG. 3K may be presented.

Figure 3M:
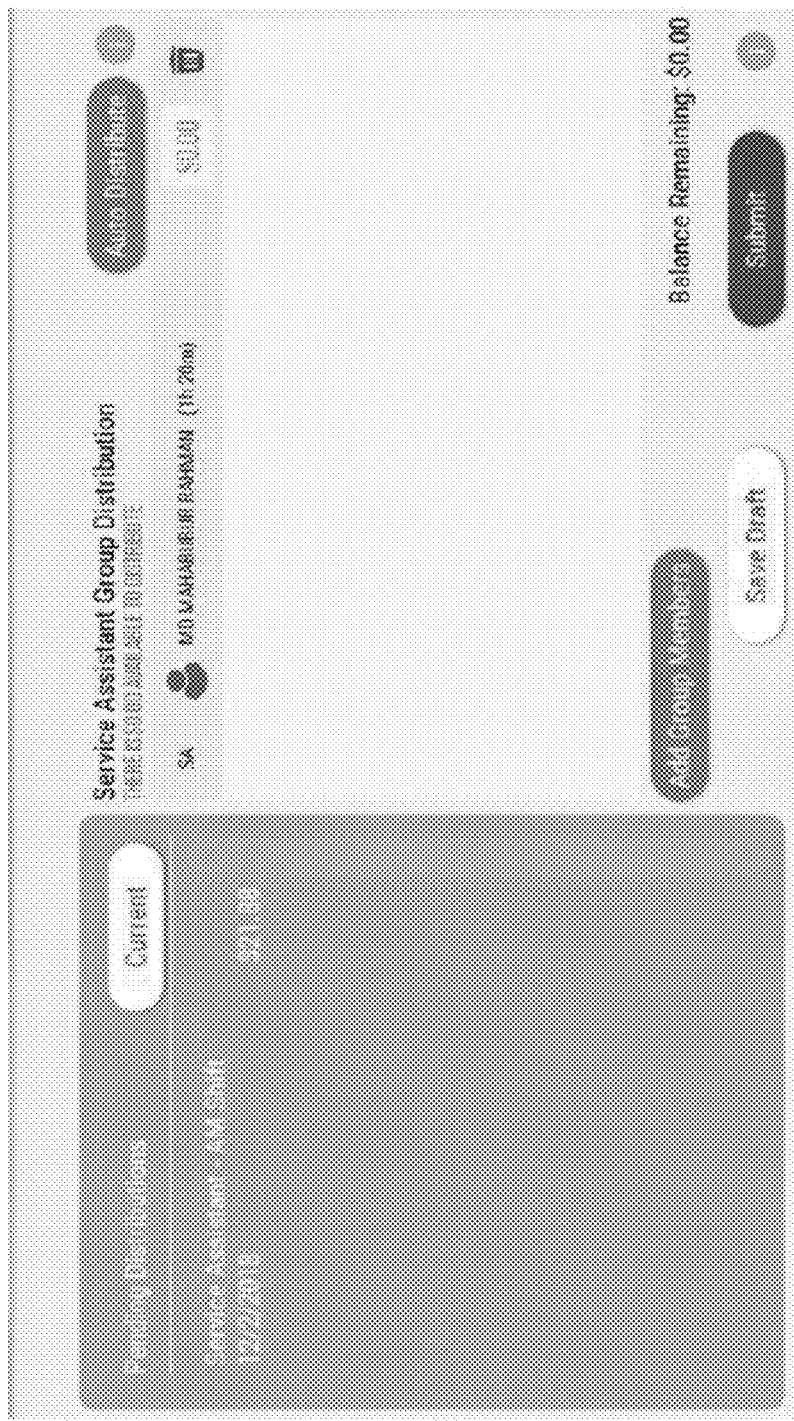

Referring to FIG. 3M, a user interface is illustrated that may be presented to a user upon logging in to the system to distribute funds (e.g., tip outs). The user interface may be for current distributions and may be populated with data accessed from a data store that indicate a current time period's distribution (e.g., for the current day). For example, the user interface may display the designated recipients (e.g., one or more groups and/or individuals), the time period (e.g., the current date), and the distribution amount The user interface may also indicate the tip amount available to distribute, and the balance that will be remaining after the specified distribution. Controls may be provided that enable the user to add additional tip out recipients and/or to delete specified recipients. An auto distribute control may be provide that, when activated, enables the specified distribution amounts to be automatically distributed to the specified recipients. A pending distribution control may be presented which, if activated, may cause the user interface illustrated in FIG. 3N to be presented.

Figure 3N:
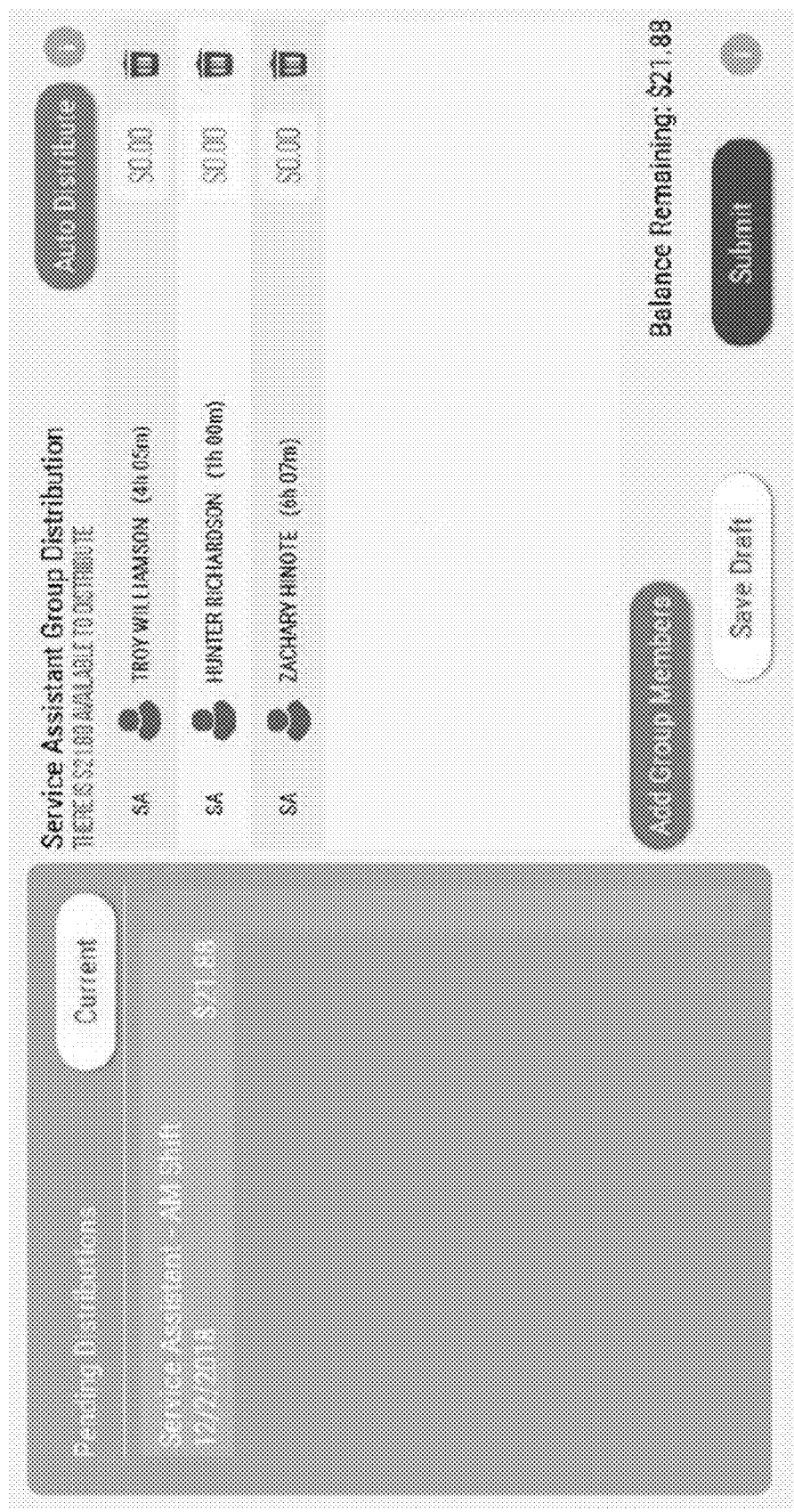
Figure 30:
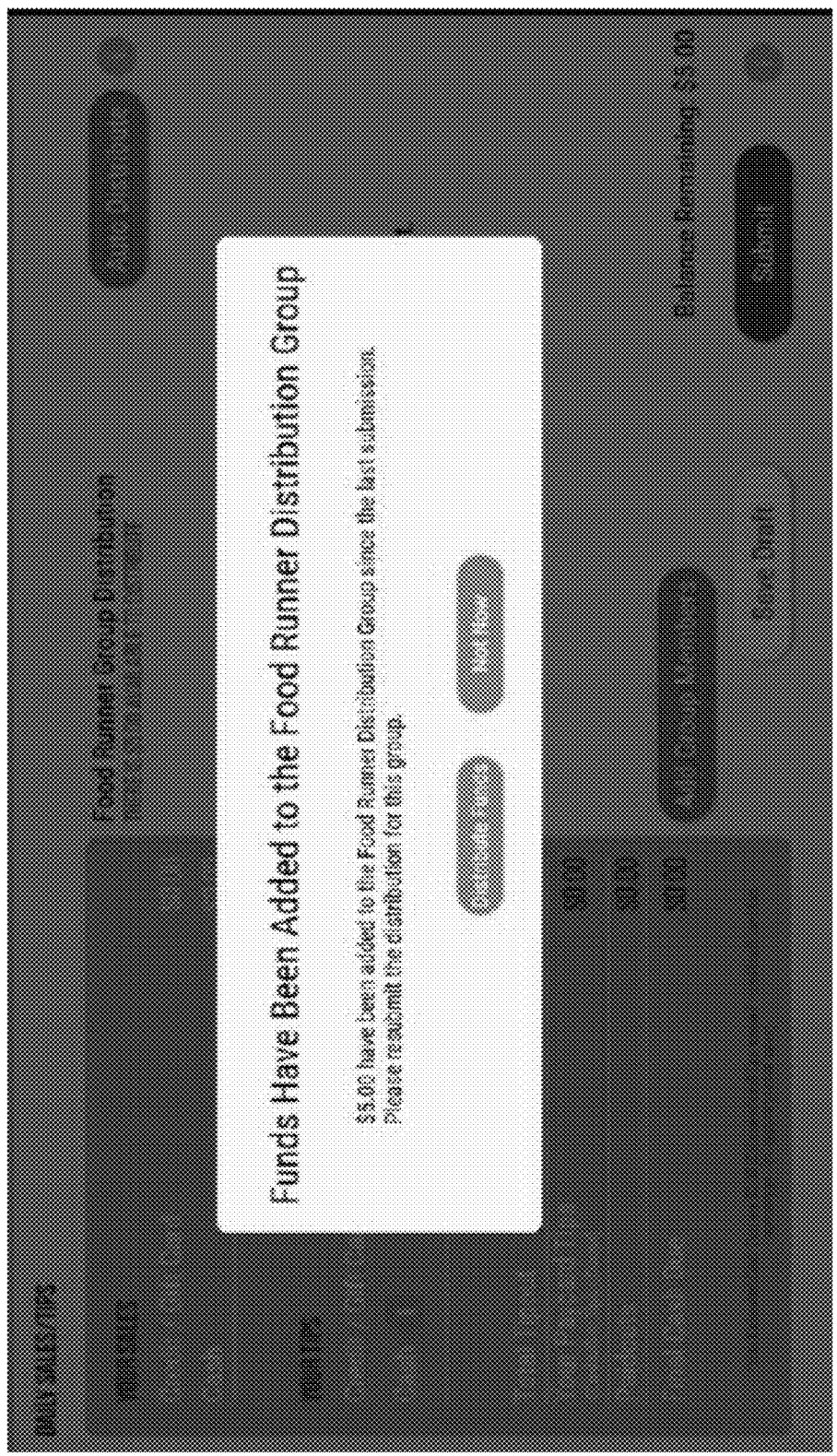

Referring to FIG. 3N, the pending distribution user interface may access and display pending distributions to entire groups for a shift (e.g., service assistants—AM shift), the members of the designated recipient groups, the hours the group members worked for the corresponding time period, the amount available to distribute, the amount to be distributed to a given recipient, the recipient title, and the remaining balance amount. As similarly discussed above, controls may be provided to delete group members from being recipients, to add group members as recipients, to save the distribution specification, and/or to submit the distribution specification for execution.

The user interface illustrated in FIG. 3O may be displayed when a user logs in or otherwise accesses the user interface when additional funds have been tipped out to the user's distribution group. The notification may include an amount added to the user's distribution group and the name of the distribution group (e.g., the food runner distribution group). A prompt may be provided for the user to resubmit the distribution for the group by activating a "distribute funds" control. A "not now" control may be provided which the user may activate if the user does not want the additional funds to be distributed to corresponding recipients at the current time.

Figure 3P:
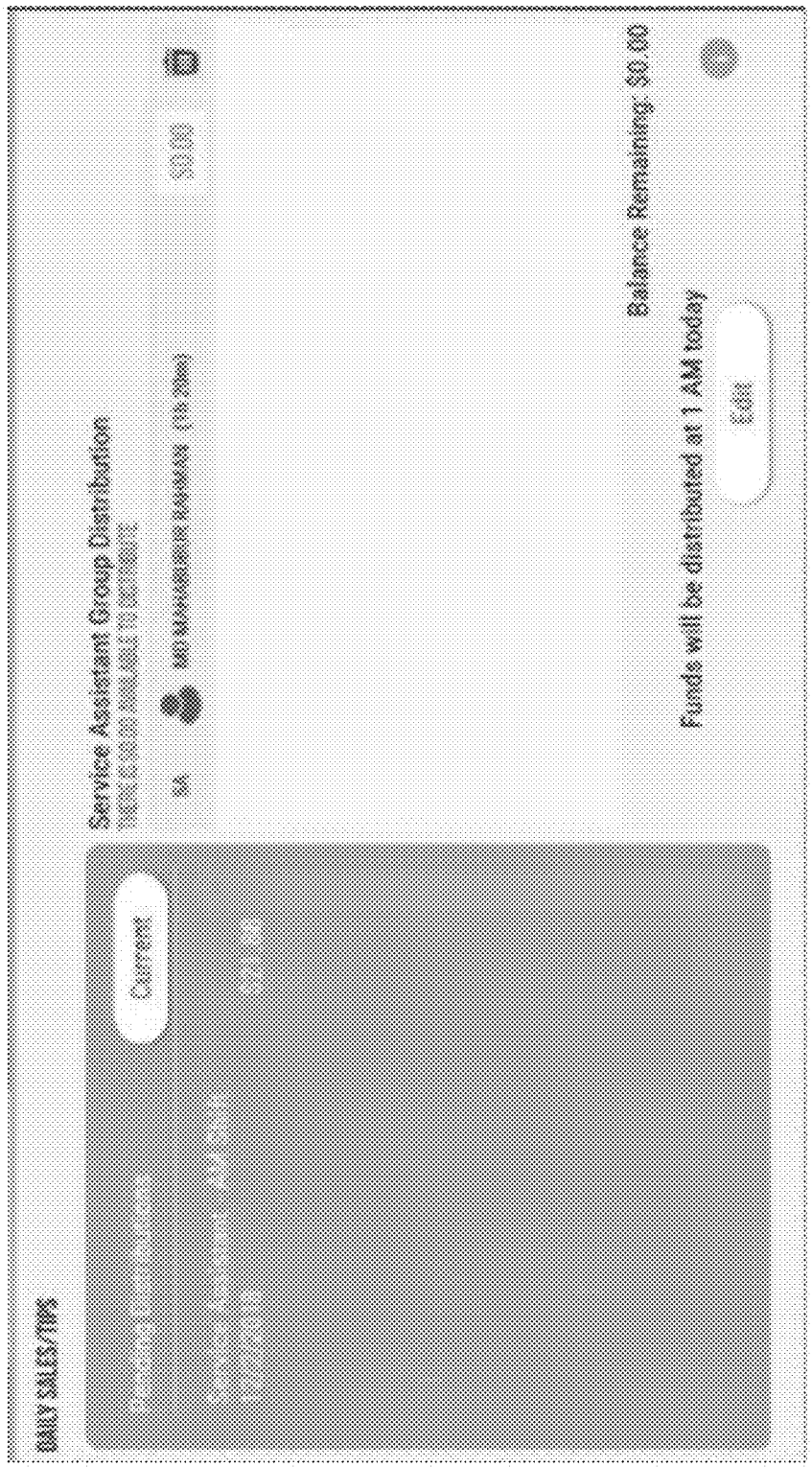

Optionally, a user may be enabled to edit a distribution specification for a specified work period (e.g., the user's current work shift). For example, the user interface illustrated in FIG. 3P may be accessed and displayed during a certain work period (e.g., the user's current shift), where the user interface may be populated using data accessed from a data store. A notification may be dynamically generated and presented via the user interface that indicates the time and/or day at which funds available for distribution will be distributed (e.g., "funds will be distributed at 1 a.m. today"). As similarly discussed elsewhere herein, the user interface may display the members of the group, the amount of hours worked for the designated time period, and the amount that will be distributed to a given group member. An edit control may be displayed if the user is still permitted to edit the distribution specification. Activation of the edit control may enable the user to edit or re-specify the distribution specification for the current time period.

Figure 3Q:
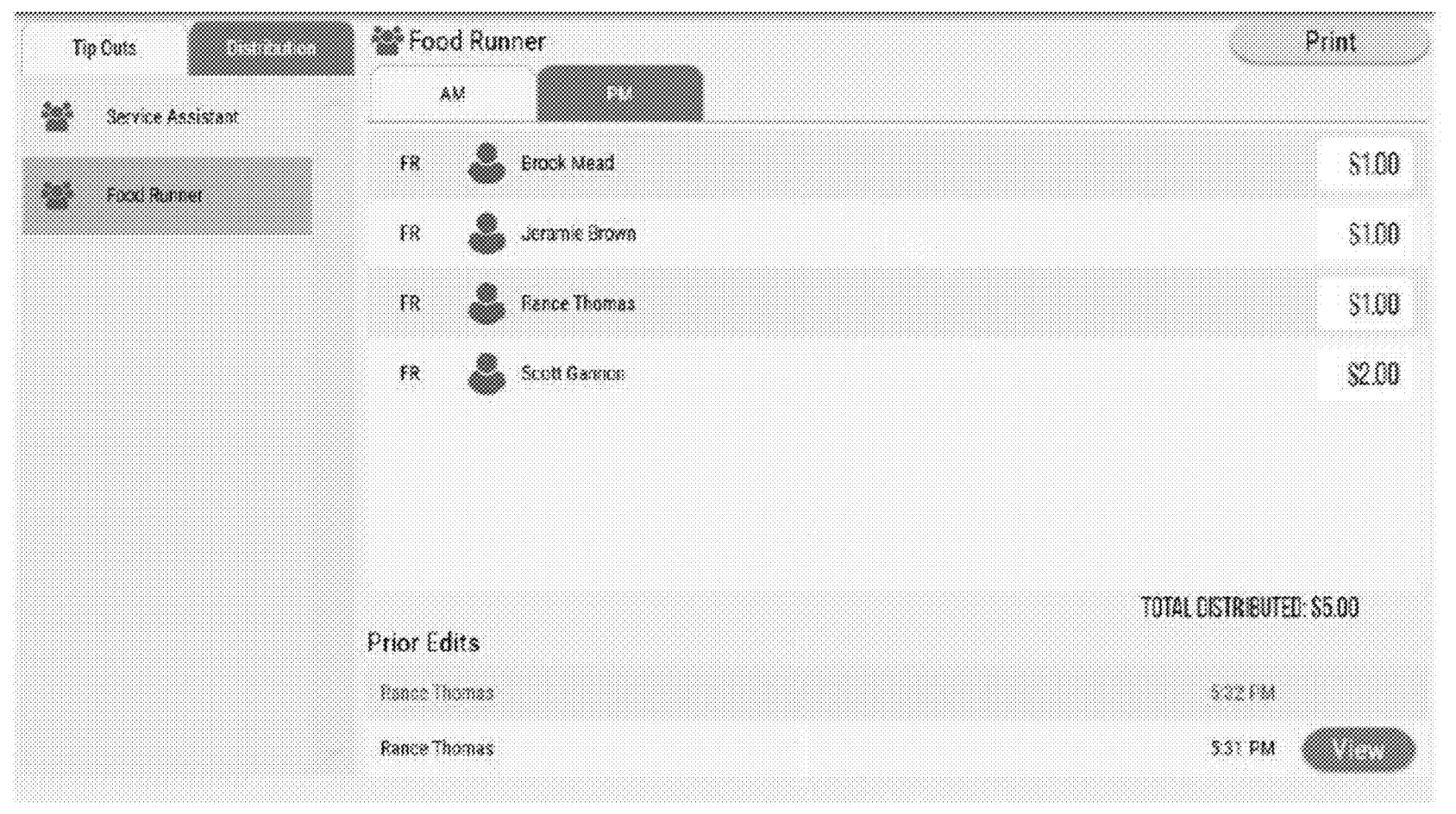

FIG. 3Q illustrates an example user interface that enables a manager to review tip distribution amounts for users that are members of a given group and/or that are working a given time period/shift. Optionally, a menu of groups may be presented that lists the groups whose tip data the manager is authorized to review (e.g., as determined from permission data accessed from a data store, where the permission data may be used to dynamically generate the groups menu). The manager may select a given group and the corresponding group members and tip distribution amounts may be accessed from a data store and presented. Optionally, two or more shift tabs may be presented (e.g., morning shift, afternoon shift, night shift, etc.), wherein activation of a given shift may display members of the selected group that are working the selected shift (e.g., as determined by a work calendar, by workers clocking in, etc.), and the associated tip distribution amounts. The user interface may also display prior edits to distribution specifications on a group by group basis and/or on a group member by group member basis. Optionally, the displayed prior edit information may provide certain limited information (e.g., the name/identification of the corresponding group or group member, and the time of the edit). A view control may be provided that when activated causes detailed edit information to be accessed from memory and displayed.

Figure 4A:
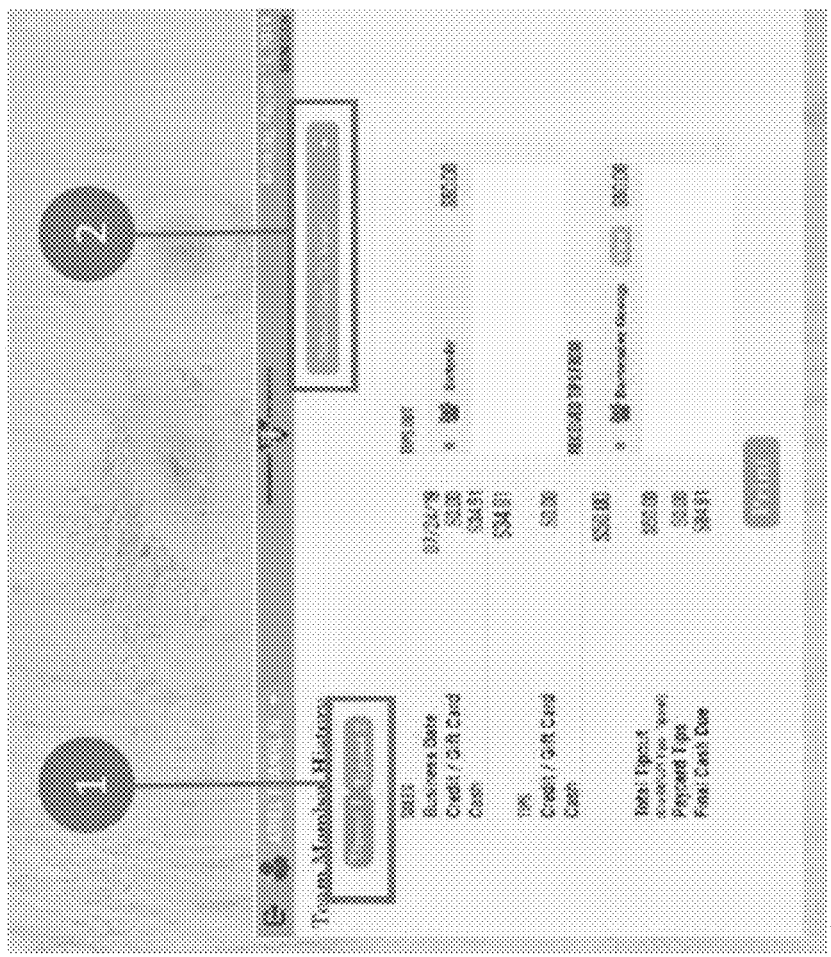
FIGS. 4A-4E illustrate additional user interfaces.

FIG. 4A illustrates an example worker history user interface. The history may have been selected via a date selection user interface. If there are multiple available tip out records detected by the portal, the user interface may be dynamically generated to include controls (reference 1) to enable a user to access a selected one of the tip out records (e.g., Tip Out 1 toggle, Tip Out 2 toggle, etc.). In response to the user selecting a given tip out toggle, the portal may access and provide for display the corresponding data. The tip toggle for the data currently presented may be emphasized (e.g., via color, outlining, bolding, or otherwise).

Figure 4B:
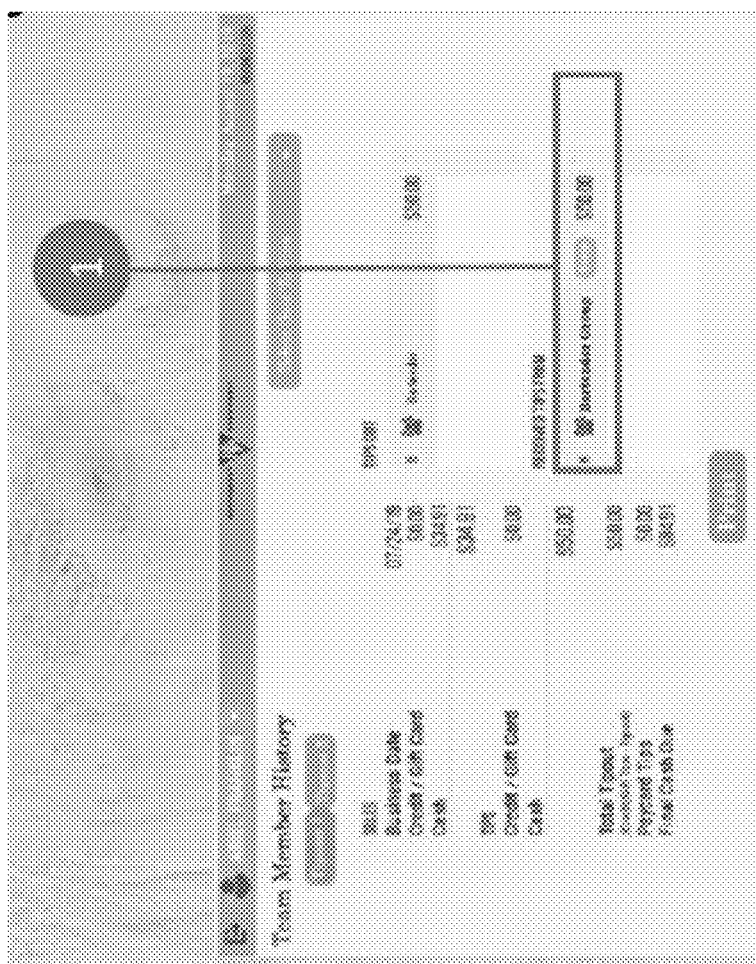

A date selection control (reference 2) may be provided which enables a user to select a desired date for which tip out data is to be presented. The selected date and corresponding data will then be accessed and presented. The tip out data may include sales data (e.g., date, an amount paid for via credit/gift card, an amount paid for in cash), tip data (e.g., a tip amount paid for via credit/gift card, a tip amount paid for in cash), total tip out amount (e.g., pay card tips, final cash due), tip out recipients (e.g., groups and/or individuals), and received tips data (e.g., the name of the group and/or individuals from which tip outs were received and the tip out amounts). If the portal detects that the received tips amount is greater than $0.00, the portal may dynamically generate the user interface to include a "view" control (see reference 1 in FIG. 4B) which, if activated, causes corresponding distribution data to be accessed and presented.

Figure 4C:
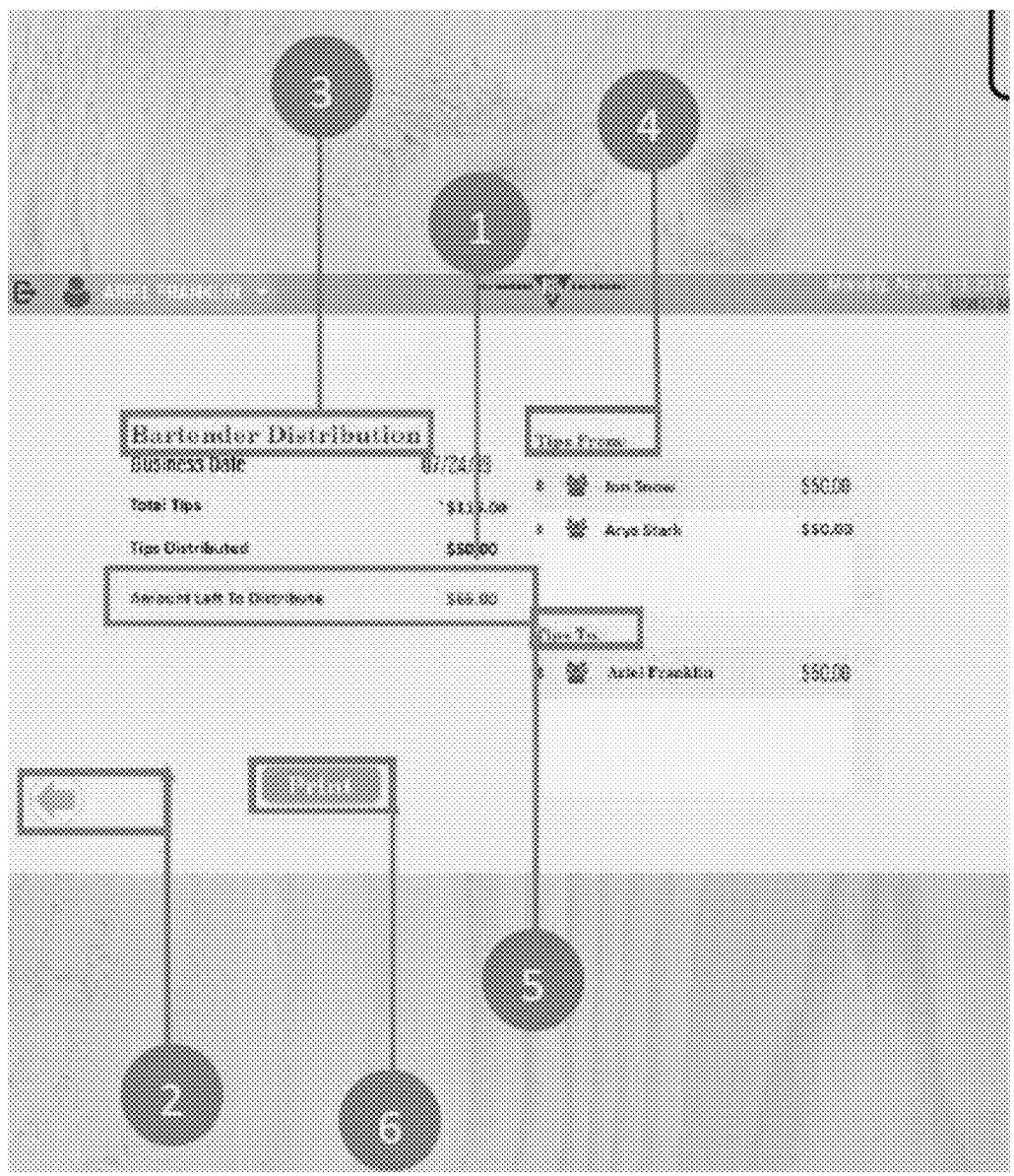

Referring to FIG. 4C, an example distribution user interface is illustrated. The corresponding group whose tips are being distributed is identified ("Bartender Distribution"—Reference 3). The business date, total tips, tips distributed and tip amount left for a group to distribute (Reference 1) are provided. Optionally, if the amount left for the group to distribute is greater than zero, the amount may be visually emphasized (e.g., via color, such as red, or otherwise). A "tips from" field lists the worker's name who provided tips to the group (reference 4). A "tips to" field (reference 5) lists the tip recipients. A print control (reference 5) is provided that, when activated, causes the user interface and data to be printed. A back control (reference 2) causes a navigation to the previous history page.

Figure 4D:
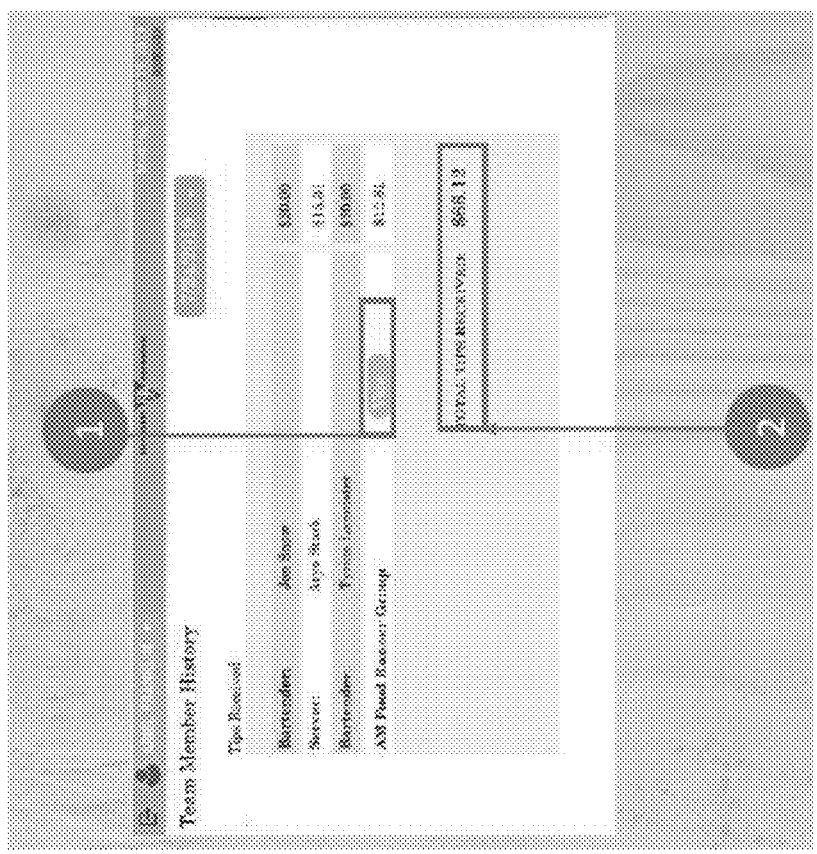

Referring to FIG. 4D, an example group/worker history user interface is illustrated (which may be accessed by a manager). The user interface may list the date, the tips received, including, for a group member tip, the group name and the group/worker name, and the tip amount. In addition, for tips received by a group, the group name may be presented in association with a view control (reference 1) which, when activated, causes corresponding details to presented and a tip amount. The total tips received may be calculated and presented (reference 2).

Figure 4E:

Referring to FIG. 4E, an example group/worker history selection user interface is illustrated. A scrollable list of group/workers (reference 1) is presented from which a user (e.g., a worker) may select a desired member. A date interface is provided (reference 2) from which the user may select a desired date whose data is to be viewed.

Figure 5A:
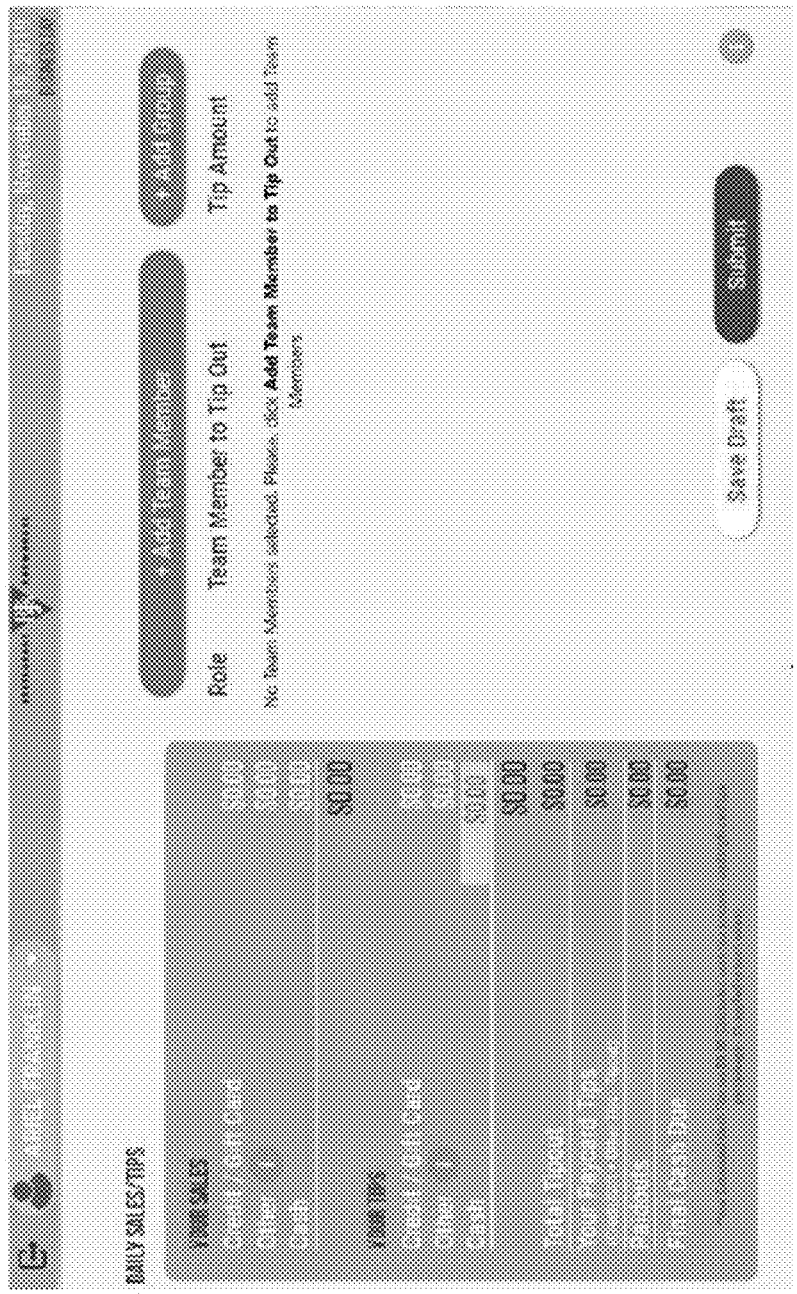
FIGS. 5A-5X illustrate additional user interfaces.

Referring to FIG. 5A, an example user interface is illustrated that accesses and reports sales and tips for a predefined time period (e.g., daily). In this example, credit/gift card, cash, and other sales (e.g., house account sales, sales made using payment services, etc.) are reported. In addition, credit/gift card, cash, and other tips (e.g., house account sales, sales made using payment services, etc.) are reported. An information control (e.g., an "I" icon) is provided that, when activated by a user, causes an explanation as to what tenders are used to calculate the value for the "other" field.

Figure 5B:
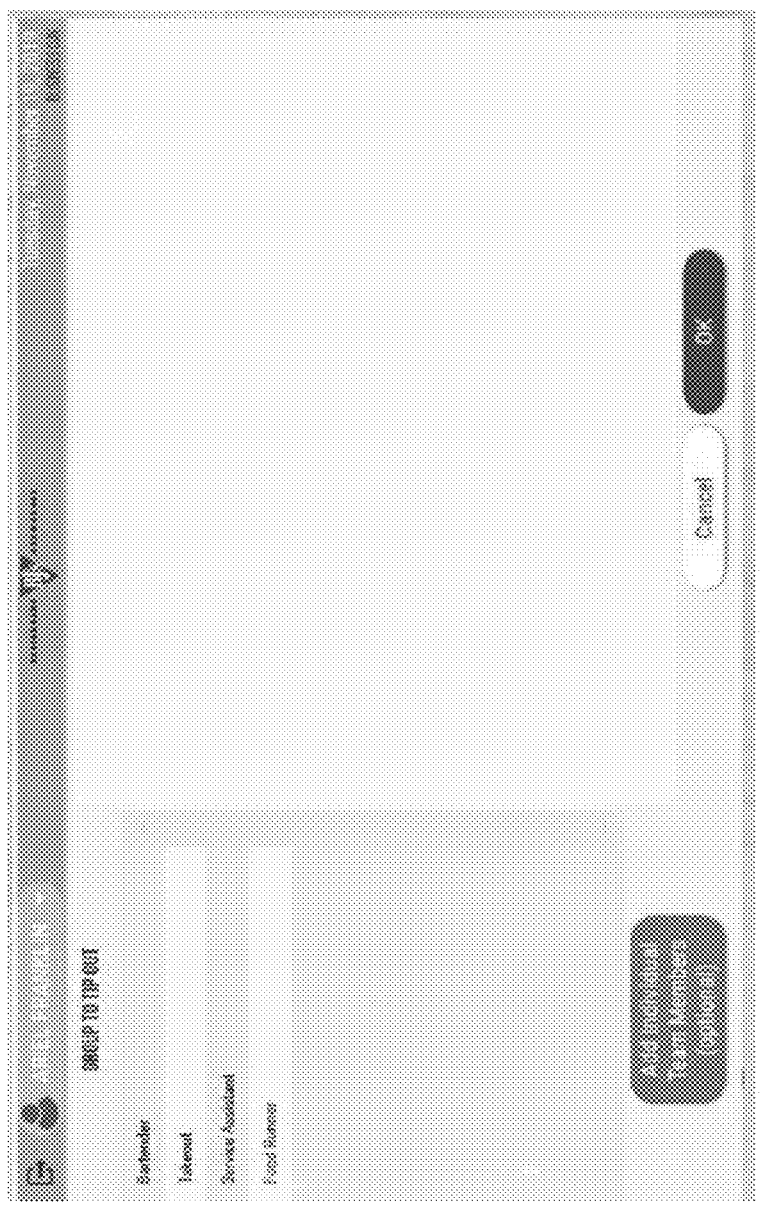

Referring to FIG. 5B, an example user interface is illustrated that accesses and lists groups by group name or position (where workers that have the same position are assigned to a group) that are eligible to receive tip outs. A control is provided that enables a user to add individual workers to the tip out list.

Figure 5C:
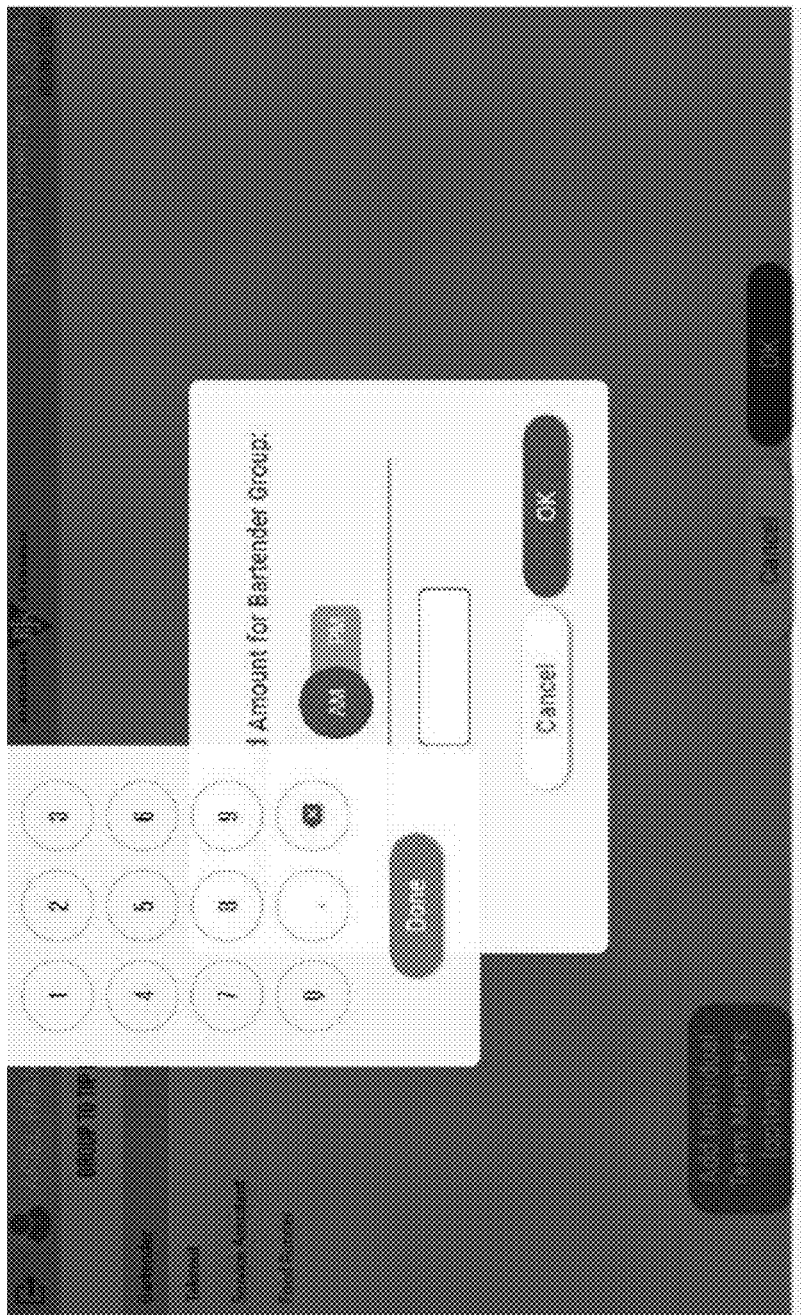

Referring to FIG. 5C, an example user interface is illustrated that provides a keypad (which may be displayed via a terminal touch screen) via which a tip out amount (e.g., a cash tip out amount) may be entered and via which a shift may be selected (e.g., AM/PM) for a group selected via the user interface illustrated in FIG. 5B. The selected group name may be presented (which may reflect the job function of the selected group). Once the user selects a shift, the user interface may display the selected shift.

Figure 5D:

FIG. 5D illustrates the example user interface of FIG. 5A, populated with an amount entered via the user interface of FIG. 5C. In this example, as displayed, a tip out amount has been made to two shifts of one group (the AM and PM shifts of the bartender group) by a worker that worked across both shifts. A delete control (e.g., a trashcan icon) is provided in association with each tip out amount which, when activated, deletes the corresponding tip out amount. A draft control may be provided which, when activated, enables the tip out data to be saved as a draft (but not yet distributed). A submit control may be provided which, when activated, enables the tip outs to be performed (optionally after a predetermined period of time or at a scheduled time to enable revisions to still be made). The "Balance Remaining" may be changed to $0. A paper chit and/or electronic chit may be generated and transmitted and/or printed showing the distribution details. Funds may be distributed at the end of the current shift or at another specified time.

Figure 5E:
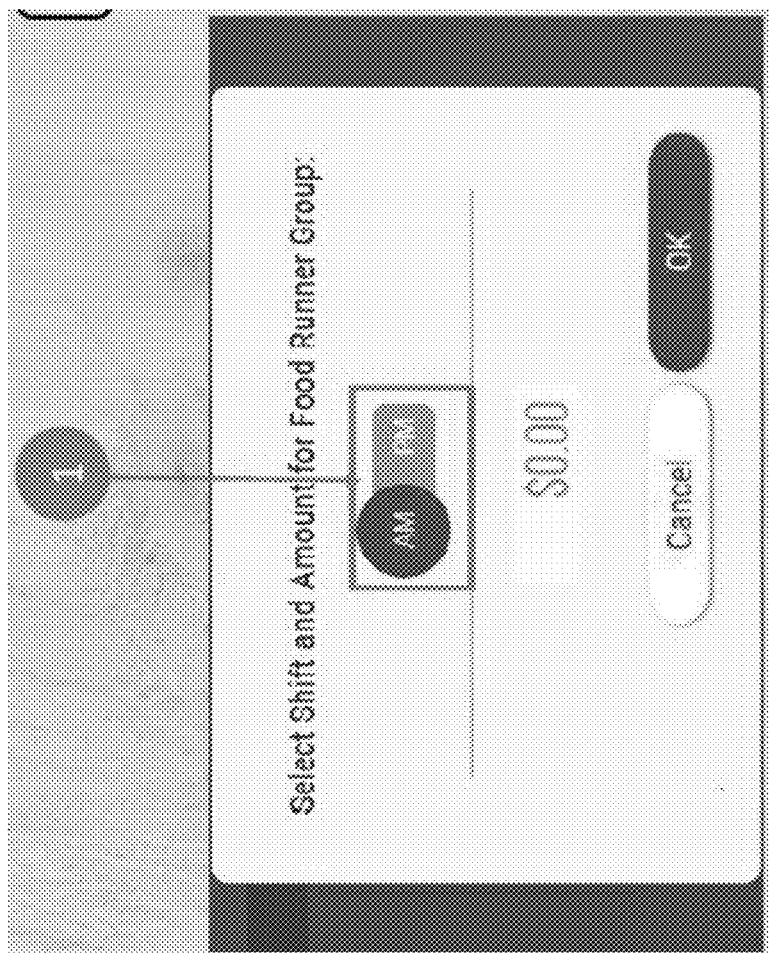

FIG. 5E illustrates an example user interface that enables a group and shift to whom the user wants to provide a tip out to be specified (via a shift selection control toggle), and enables the tip out amount to be specified. Activation of an "OK" control causes the entries to be saved. Activation of a "cancel" control causes the entries to be discarded. Optionally, the shift control will be automatically set to the current shift. Optionally, a user may be prevented from selecting a different shift. Optionally, the shift selection toggle is only displayed within a predetermined range of times (e.g., during all or a portion of a shift, such as a time where workers may commonly work across two shifts, such as 4 p.m. to 3 a.m., where the AM shift is 7 a.m. to 5 p.m., and the PM shift is 5 p.m. to 3 a.m.). Optionally, rather than displaying a shift selection control, the current shift is simply displayed.

Optionally, if a worker is working across two shifts and wants to provide a tip out to groups or individuals in both shifts (e.g., an AM shift and a PM shift), the worker may first select a group (e.g., bartenders) to receive the tip out, specify the AM shift, and enter the tip out amount. Then, to tip out to the PM shift, the worker again selects the same group (e.g., bartenders). This time, the portal causes the shift selection control to automatically shift to the PM shift (because the portal has detected that the AM shift has already been tipped out by the worker), and the worker can enter the tip out amount for the PM shift.

Figure 5F:
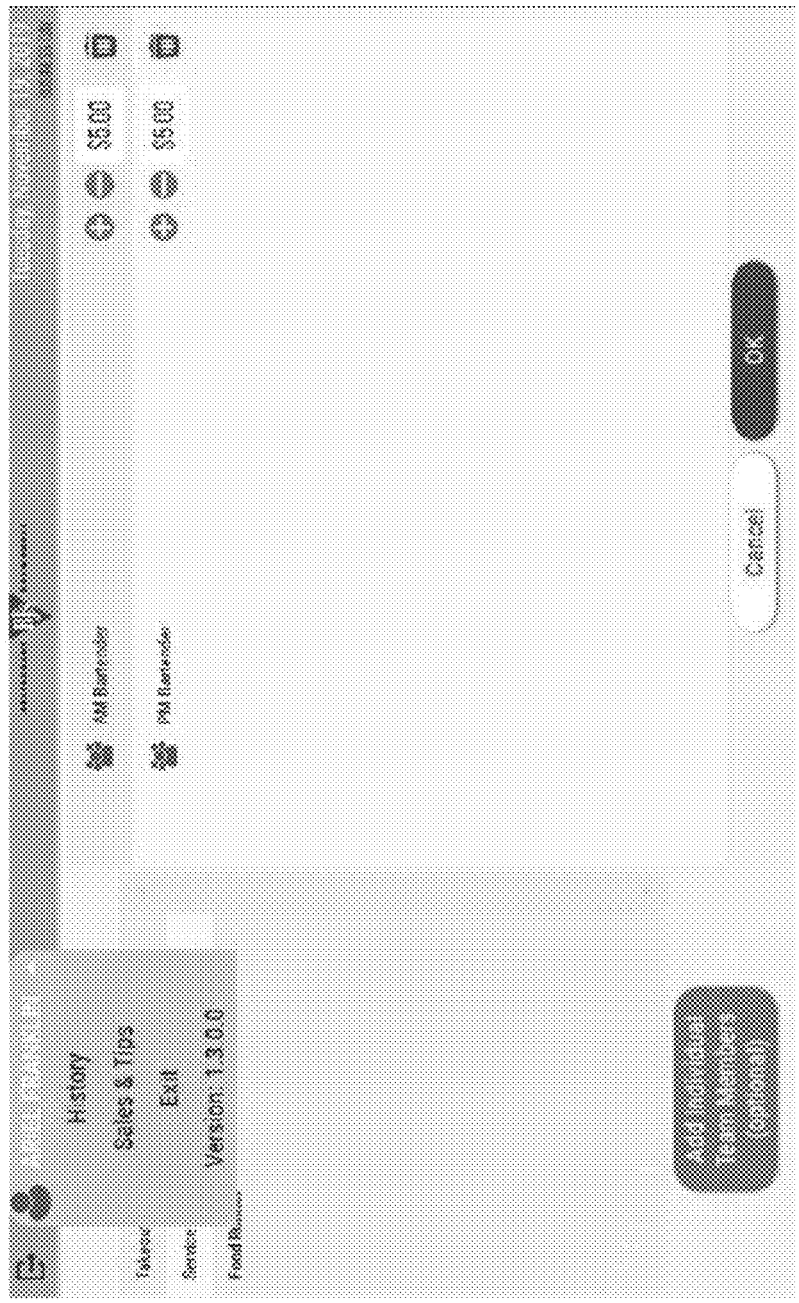

FIG. 5F illustrates an example user interface that enables a history (e.g., of daily sales, tips, and tip outs) for a worker (a group/worker) to be selected from a menu.

Figure 5G:
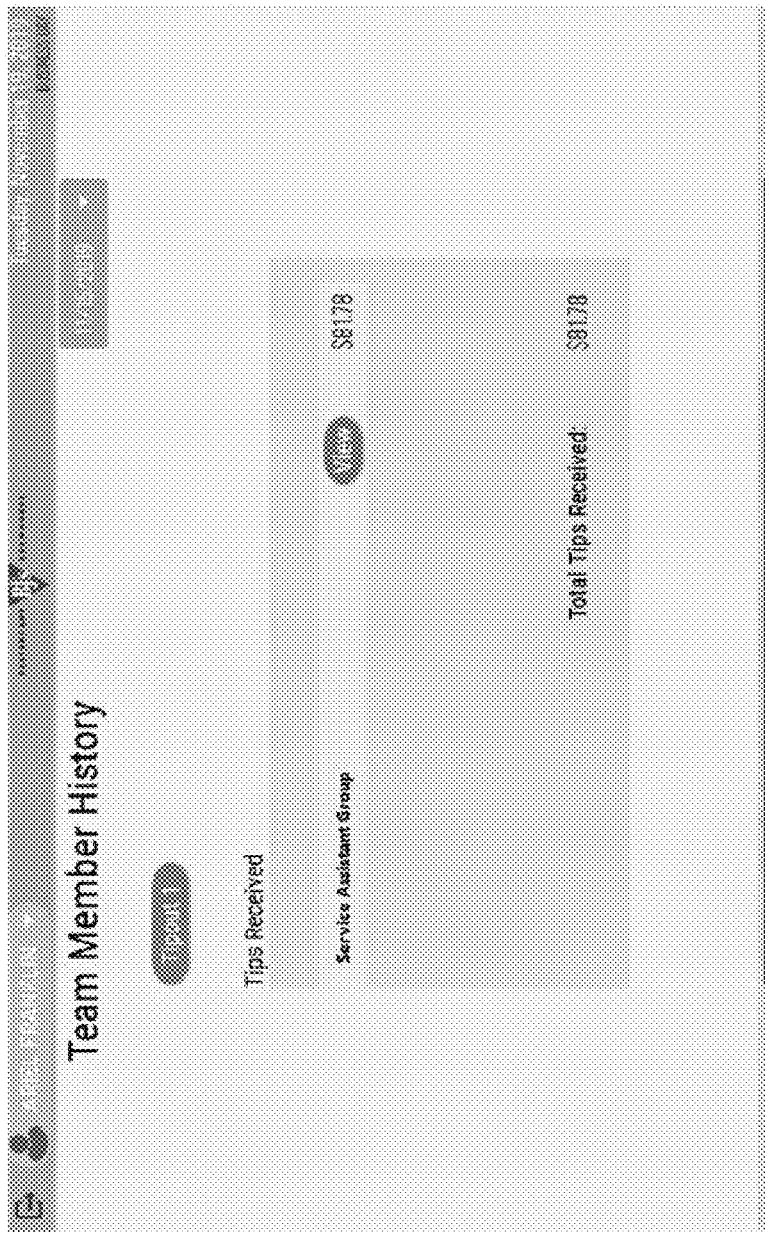

FIG. 5G illustrates a user interface that accesses and displays a tip history for a given date or data range for a given indirectly tipped group/worker. The user interface lists the tips received, the amount of the received tips, and the source (e.g., the groups) of the received tips. Activation of a "view" control may enable distribution data to be accessed and displayed. A total tip amount may be calculated corresponding to the listed historical tip amounts, and the total may be displayed. The total tip amount may be applied to the member's payroll account or other financial account or instrument. The history may be limited to a specific date or range of dates.

Figure 5H:

FIG. 5H illustrates a user interface that accesses and displays tip distribution for a given group (e.g., a Service Assistant group) for a given business date, including the date, total tips, total tips distributed, and if there are any pending distributions, the calculated amount of tips left to distribute. A report may be generated showing the pending distributions. The example user interface accesses and displays the tip outs for each group member, including the group member name and tip out amount. The example user interface accesses and displays a scrollable list of the tips received, including the source name and tip out amount.

Figure 5I:
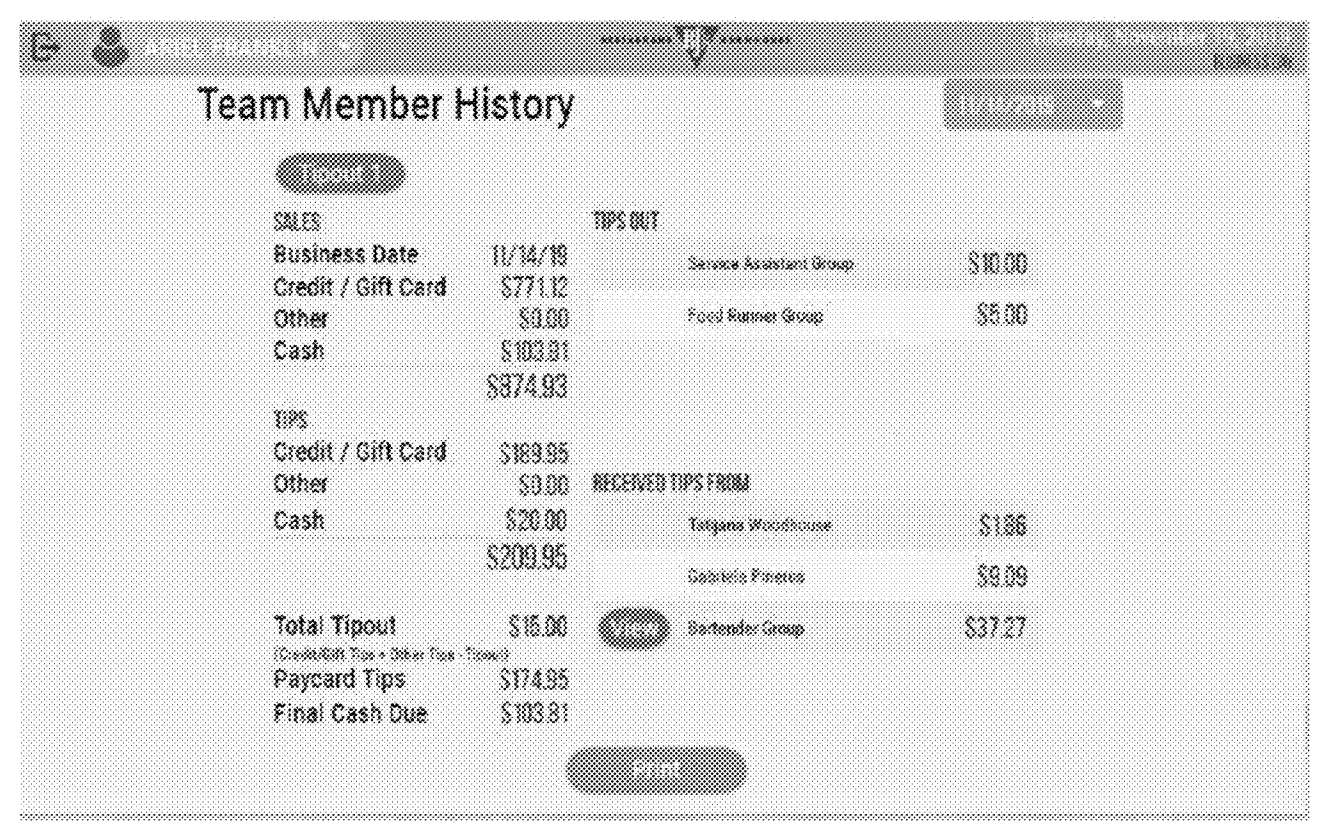

FIG. 5I illustrates a user interface that accesses and displays a group/worker history for a selected date or date range. In this example, the business date, credit/gift card, cash, other sales (e.g., house account sales, sales made using payment services, etc.), and total sales are reported. In addition, credit/gift card, cash, other tips (e.g., house account sales, sales made using payment services, etc.), and total tips are reported. Further, total tip out amounts, pay card tip amounts, and final cash due amounts are reported. The group names and/or individuals that received tip outs from the worker, and the tip out amounts are reported. The group names and/or individuals that provided tip outs to the group member may also be identified and the provided tip amounts reported. Activation of a "view" control causes distribution data to be accessed and displayed (e.g., portal chit information, who the group/worker tipped out, who tipped the worker out, and team details of the group that provided tip outs to the member).

Figure 5J:
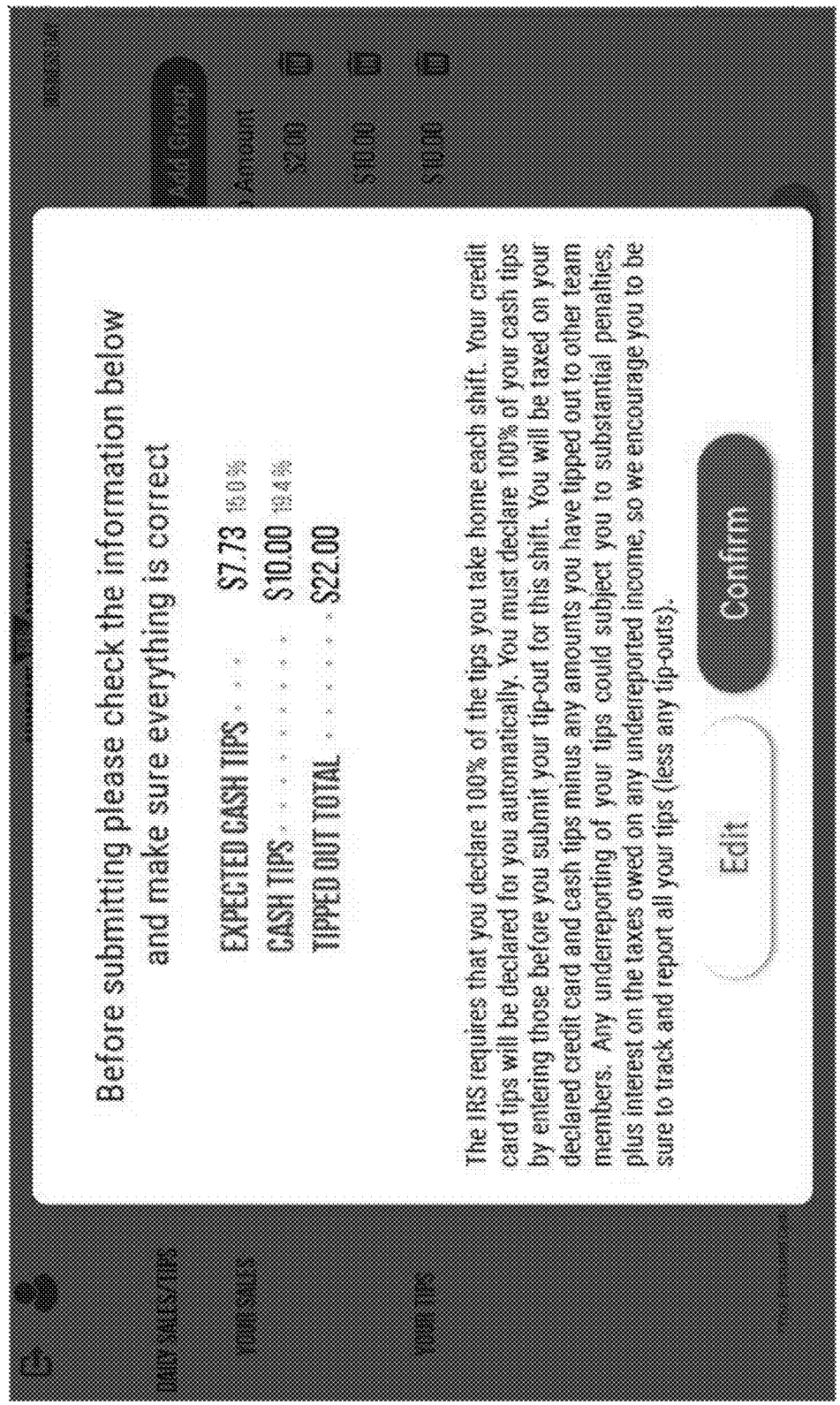

FIG. 5J illustrates an example user interface presenting summary tip out instructions for a worker, where the user is prompted to confirm the accuracy of the data. If the information is accurate, the user may activate a confirm control in order for the data to be recorded. If the information is inaccurate, the user may activate an edit control in order to access an edit user interface and edit the data. If the worker confirms the accuracy of the data, the chit illustrated in FIG. 5K may be printed, including the corresponding data.

Figure 5L:
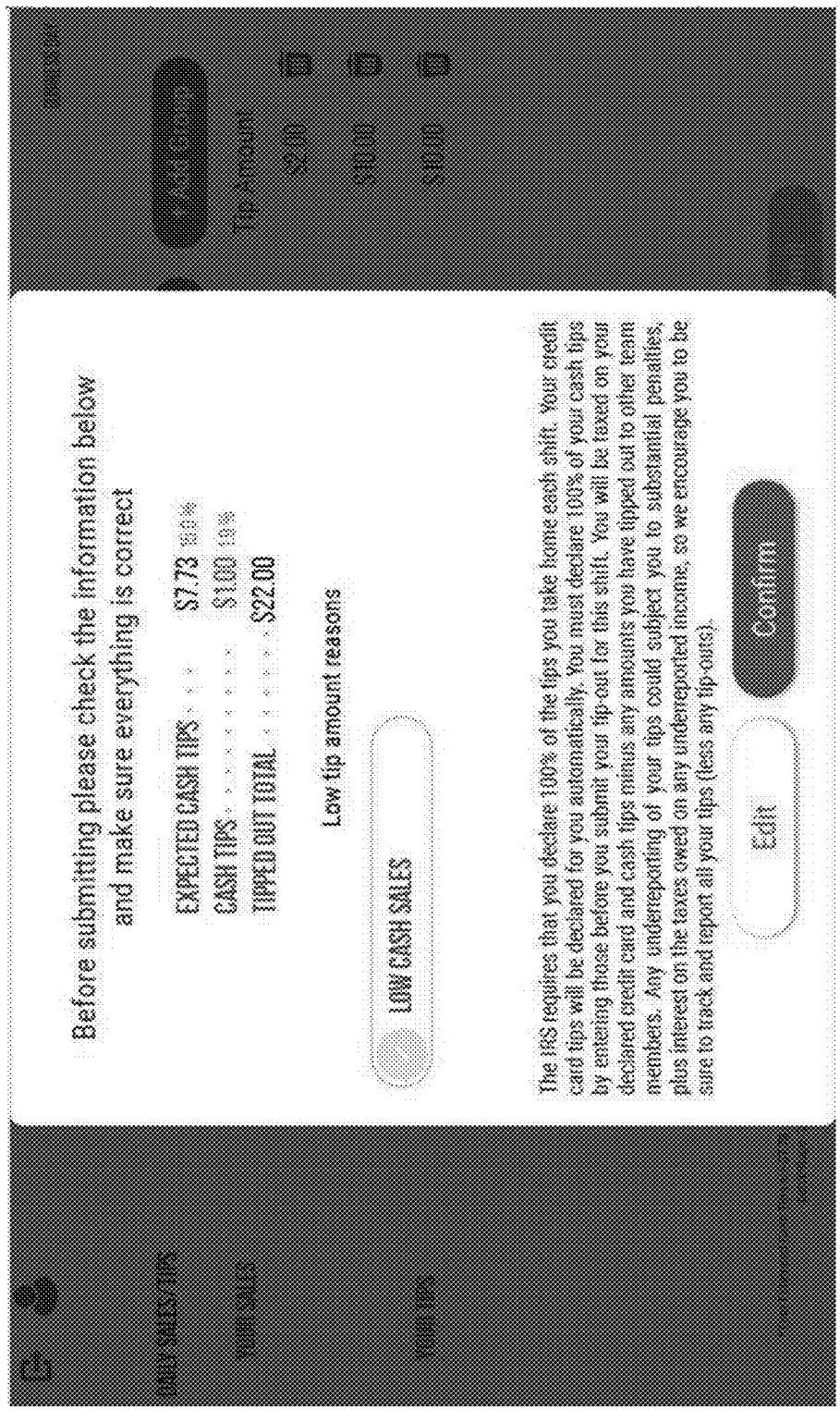

If, when a worker enters cash tips via a corresponding user interface, and the declared cash tips are less than a threshold percentage of sales made by the worker (e.g., 15% of sales), the user may be prompted to view the user interface illustrated in FIG. 5L to confirm and acknowledge that the tip declaration is below the threshold (e.g., by selecting a "LOW CASH SALES" control). If the declared cash tips are at or above the threshold, the low tip alert will not be displayed. The user interface may display expected cash tips at an indicated percentage of sales, cash tips and a calculated percentage of sales, and tipped out total.

Figure 5M:

FIG. 5M illustrates an example user interface that enables a worker (e.g., a closing worker) to distribute funds to other workers. The user interface may access and display, via a group distribution tab area, pending distribution information, including the name of each worker, the shift they worked, the date, and the pending tip amount to be allocated to the worker. An auto distribute control is provided, that when activated, causes tips to be automatically divided among group members based at least in part on the hours each worker worked during the corresponding shift.

The user interface enables the worker to manually distribute tips to workers via corresponding amount fields. The following information may be displayed: team/group name (e.g., "Food Runner Group Distribution"), the names of the group members to receive distributions, the amount of time they each worked, and the amounts to be distributed to the workers. The amount of funds available to distribute may be calculated and provided for display as "Balance Remaining". An "add group member" control is provided which, when activated, causes a user interface to be displayed that enables the group member to add one or more group members (e.g., if a worker is missing from the group distribution tab).

If the closing worker (e.g., of a group such as the Food Runner group) distributes funds using the group feature but does not close certain service areas (e.g., cocktail and bar), the next time a worker from that shift in question logs into the portal, the worker will be prompted via a user interface that there are funds waiting to be distributed to the worker's group.

Figure 5N:
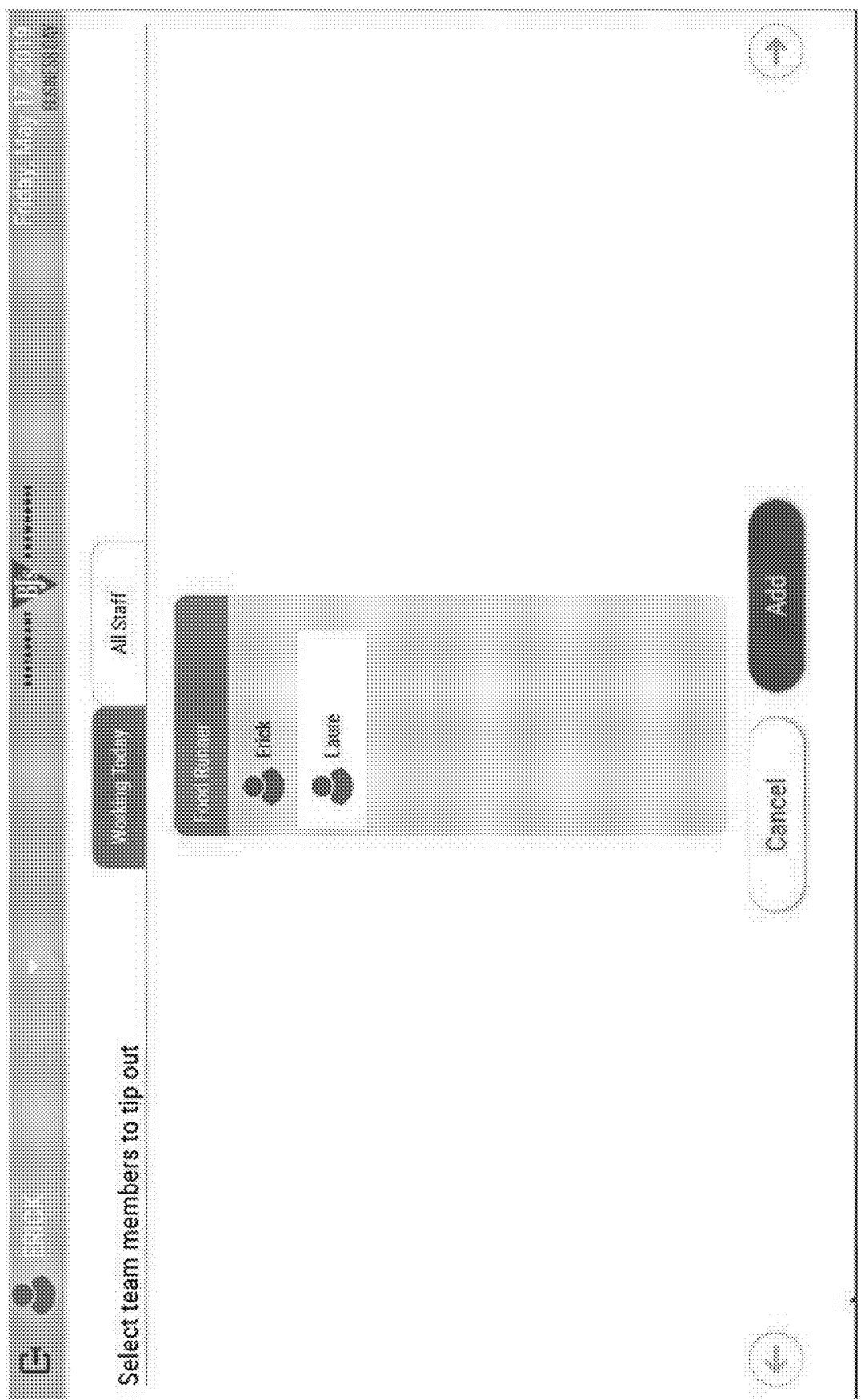
Figure 50:
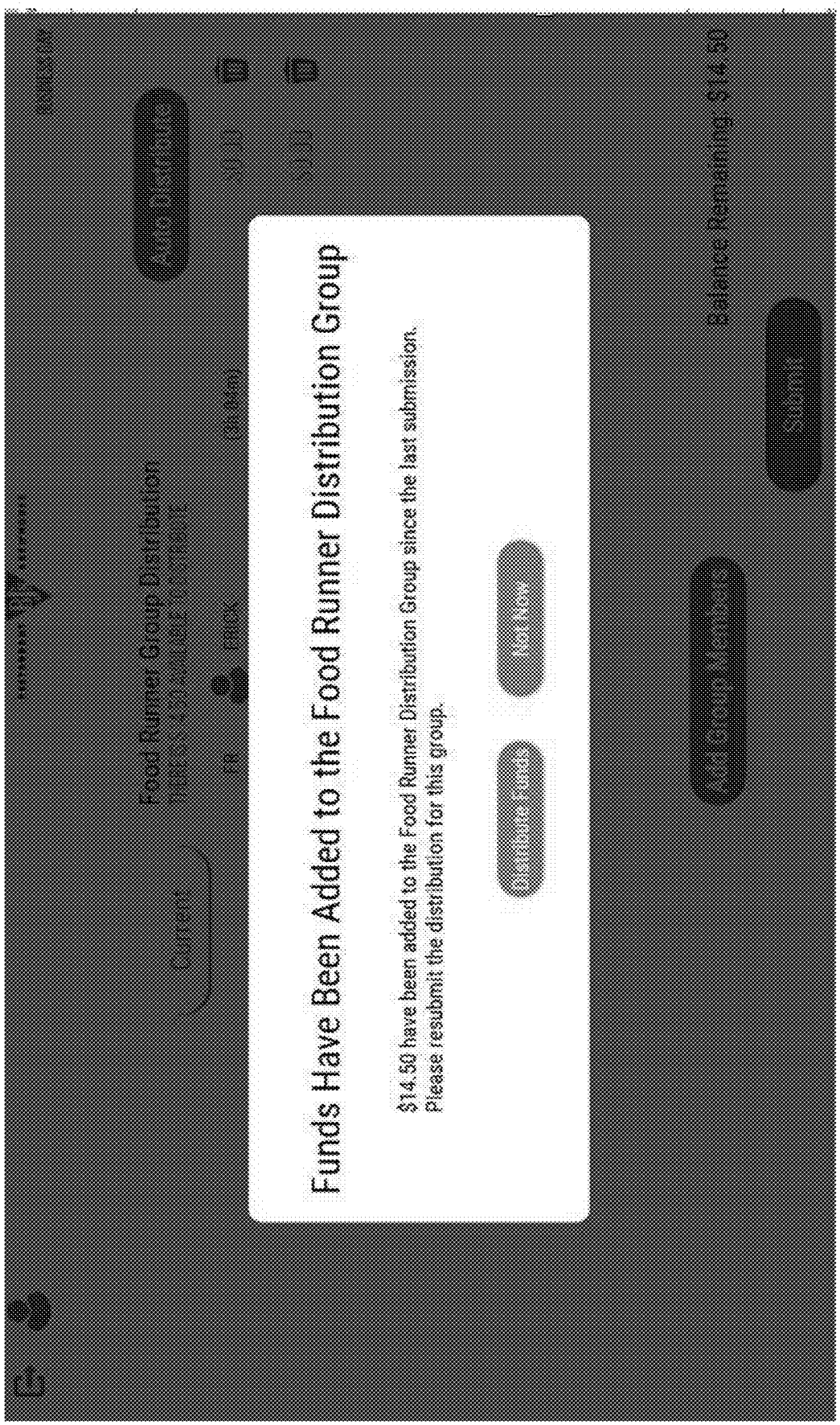

The example user interface illustrated in FIG. 5N lists all workers, including those that are not currently listed in the group distribution tab of the user interface illustrated in FIG. 5M as they are not working the current day. Optionally, a control may be displayed via which the worker can specify that all staff are to be listed or that only a filtered list (e.g., staff working the current day). One or more of the listed workers may then be selected and added to the group distribution tab. Optionally, if a worker is added to the group tipping feature, optionally, they will not receive tips through the distribution function.

If funds have been added to a group after tips have been distributed or if tips were never distributed for a given shift, a worker from that job code may need to distribute those funds. Optionally, the portal may cause a notification (e.g., a pop up notification on a terminal accessed by the worker, such as that illustrated in FIG. 5O) to be presented upon logging into the portal to distribute remaining funds. As discussed elsewhere herein, a distribution chit may be generated and distributed electronically to the worker specifying the distribution. Optionally, workers may access a distribution history user interface to view their past received tips.

A user (e.g., a manager) with appropriate permissions may be enabled to access user interfaces via a terminal (e.g., a point of sale terminal) to view historical tip and sales related data (such as that discussed herein), edit entries, verify tip distributions, print or reprint portal chits. In addition, such a user may create an entry, view the status of an open entry, and generate reports (which may report some or all of the data and actions disclosed herein).

Figure 5P:
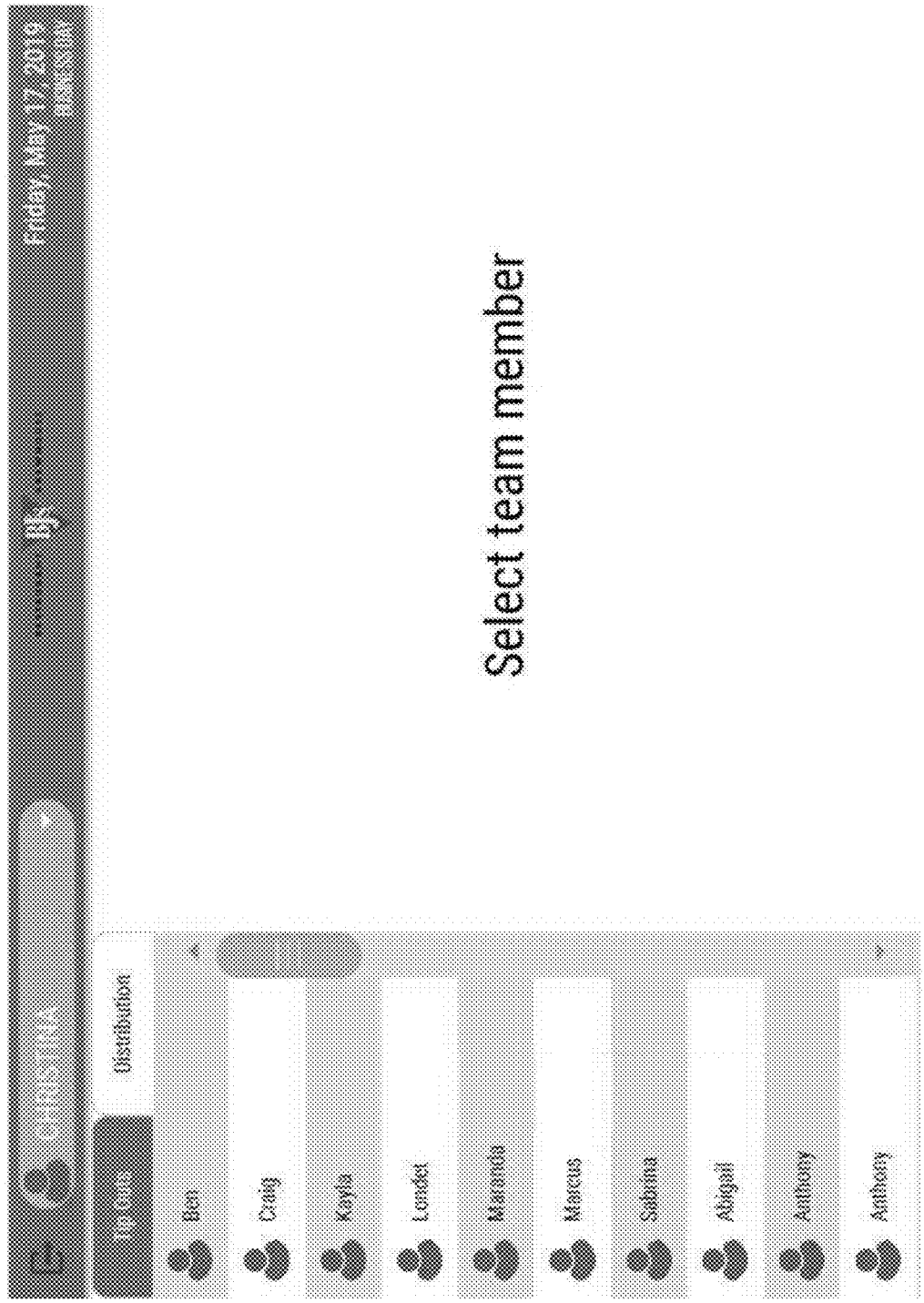

A manager may select, via the user interface illustrated in FIG. 5P, a worker from a worker name listing, and select (via a tap) the data to reviewed (e.g., tip outs or distributions).

Figure 5Q:
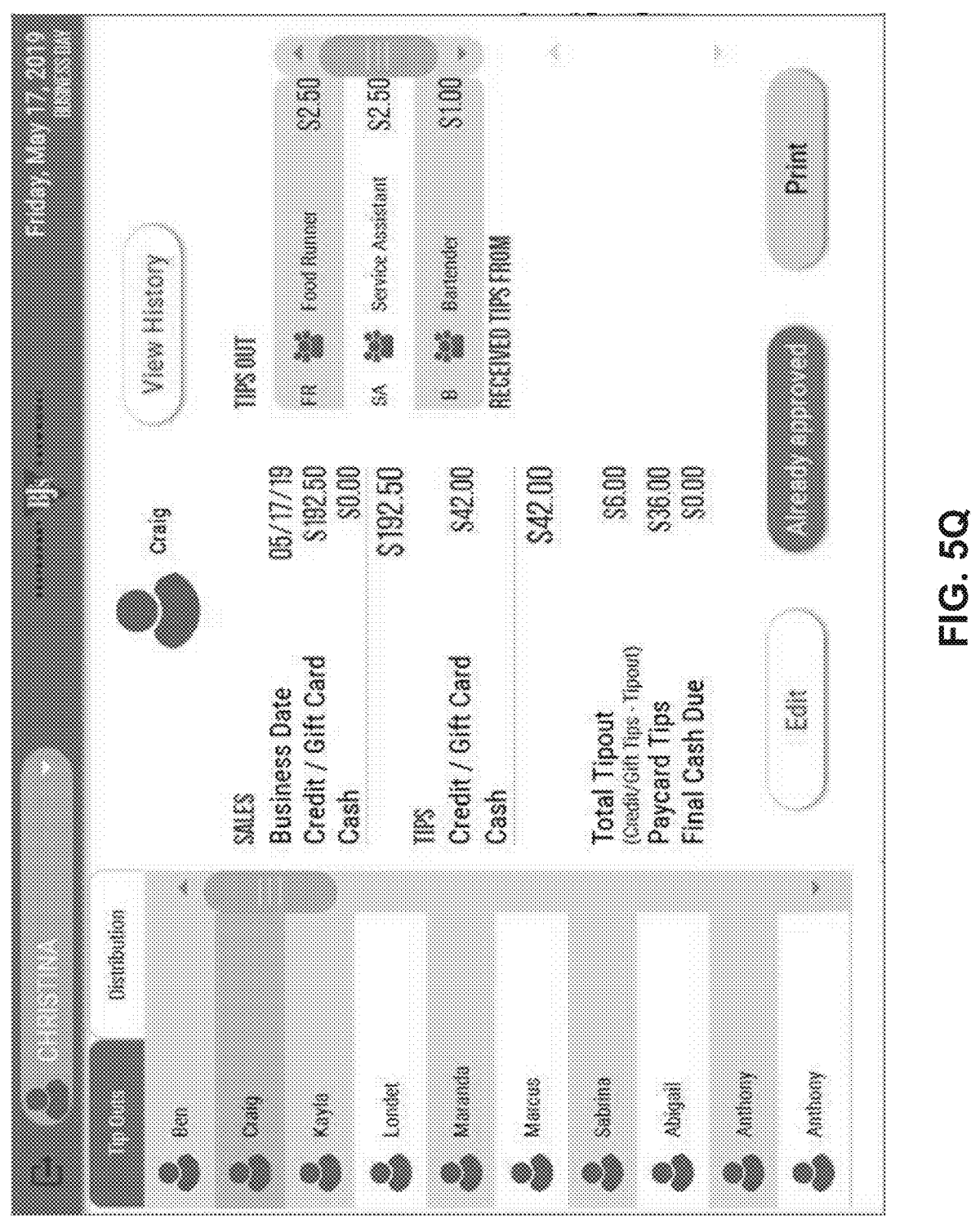

Referring to FIG. 5Q, an example user interface enables an authorized user/manager to view history information for a selected worker. The user interface enables the verification of workers' entries, the editing of existing entries, viewing of historical data, or reprinting their portal chit, which may be submitted with their cash out. Controls are provided via which editing can be enabled ("Edit"), the data can be printed ("Print"), and, if not already approval, approval may be submitted.

Figure 5R:
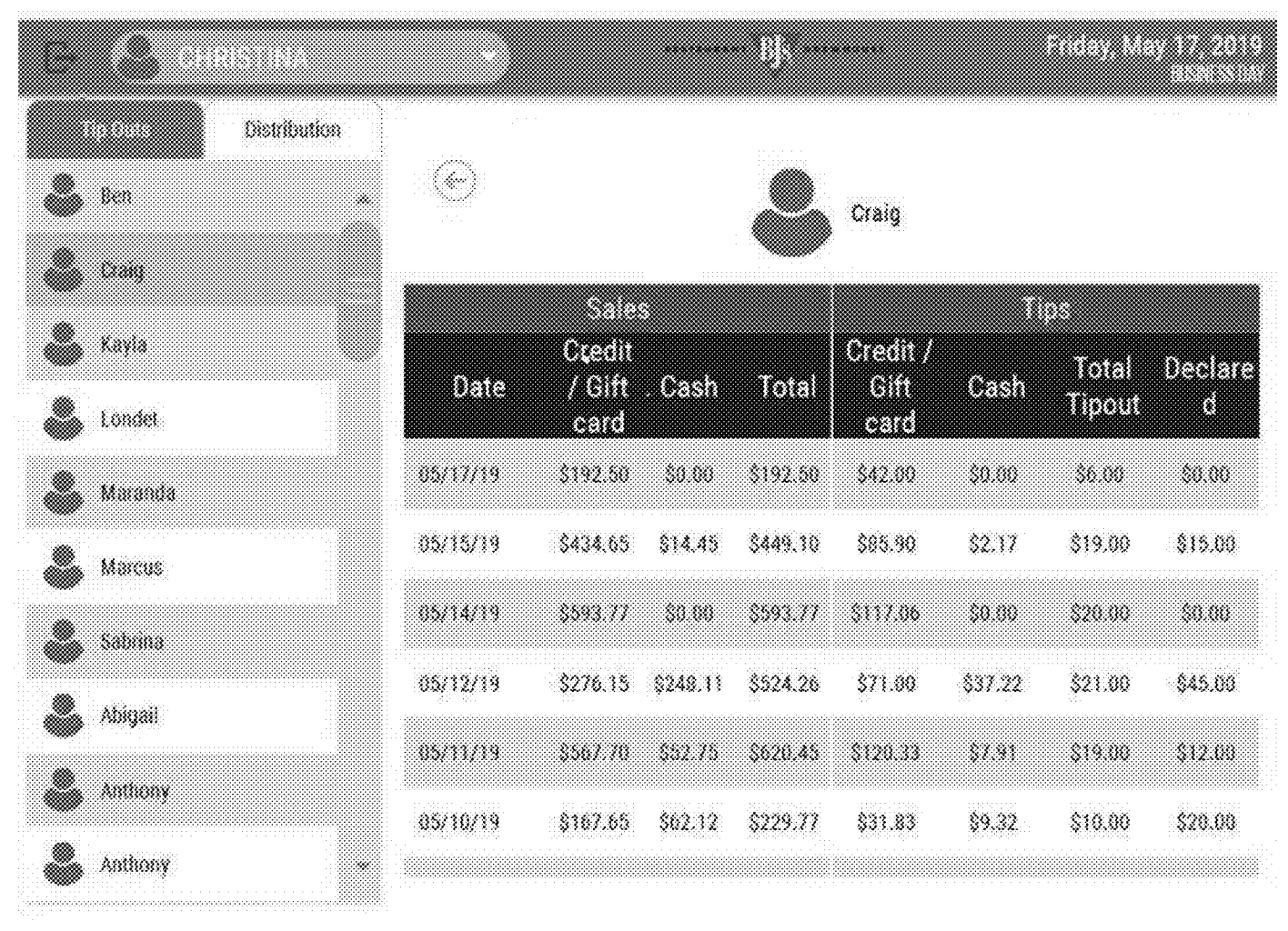

Referring to FIG. 5R, an example history is displayed for a worker selected via the user interface illustrated in FIG. 5Q. A tip out tab and distribution tab are provided. In this example, the tip out tab is selected, and corresponding data is displayed. The list of workers may be displayed, with the selected worker highlighted. Sales information may be provided, including respective dates, payment amounts made with credit/debit/gift cards, payment amounts made with cash, and total sales amounts on a daily basis. Tip information may be provided, including respective dates, tip amounts for tips made with credit/debit/gift cards, tip amounts made with cash, total tip out amounts, and cash tips declared. The user interface may include a date selection interface via which a user may specify a date or date range for which the history is to be provided.

Figure 5S:
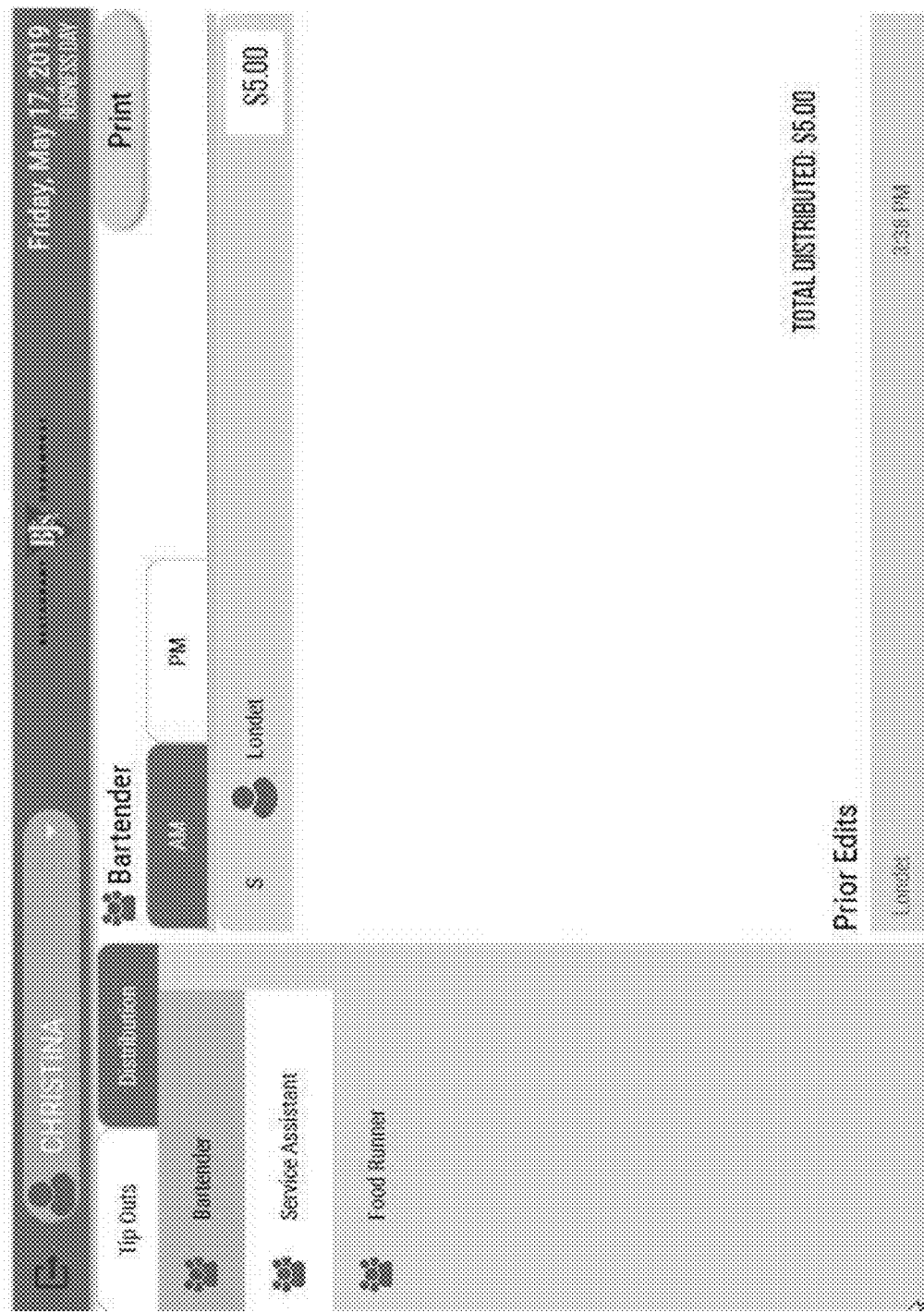

Referring to FIG. 5S, an example distribution history user interface is displayed. A list of groups for whom distribution history information is available is provided. The user may select a group (e.g., bartender), and the corresponding workers may be displayed for a given shift. Shift tabs are provided via which the user may select which shift's history is to be displayed (e.g., AM, PM). The user interface may list distribution allocation to each worker, view edits made to such distributions, and print out or display a chit that lists the distribution specifics.

If a worker failed to complete providing the data or instructions needed to complete the tip distributions or tips outs (and therefore did not receive their credit card tips), a manager (or authorized user) can access the portal and provide the needed data or instructions.

Figure 5T:
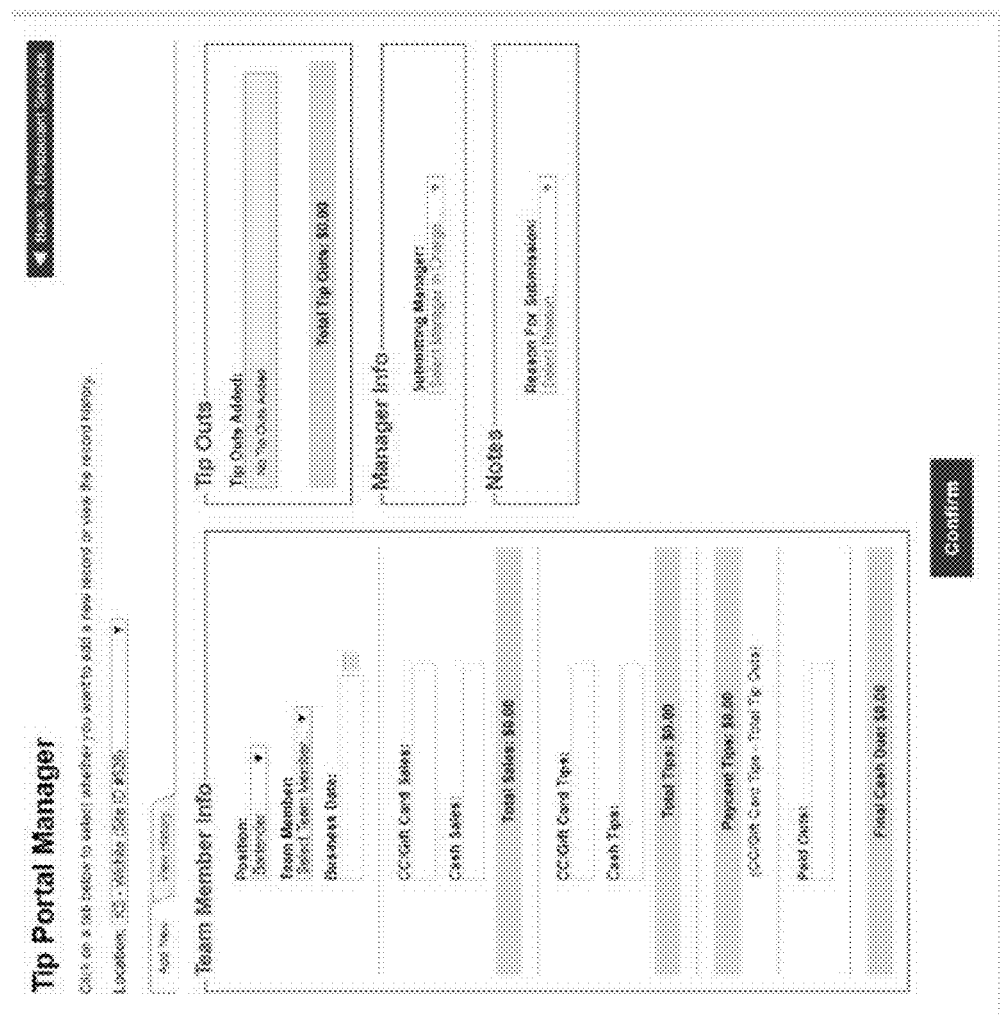

Referring to FIG. 5T, the manager may log into a master data portal, select a "Tip Portal Manager" control, and select a position from a position (e.g., bartender) menu. A worker menu may be populated with the names of the workers of the selected position. The manager may select the worker for whom the manager wants to create an entry, select the date for when tip portal should have been completed, and enter sales data (e.g., from the worker cash out report), such as credit card/gift card payments and cash payments. If the worker did not have a paid out, the manager may enter a value of $0.00. The manager may enter tip outs (e.g., credit card or cash tips), pay card tips, paid outs, if any. The manager may select a "submitting manager" from a manager information menu, and select a reason from a "reason for submission" menu that the manager is completing a manual load. Optionally, if the manager fails to provide a reason for the manager completing the manual load, the portal may prevent the submission of the manager's entry.

Figure 5U:
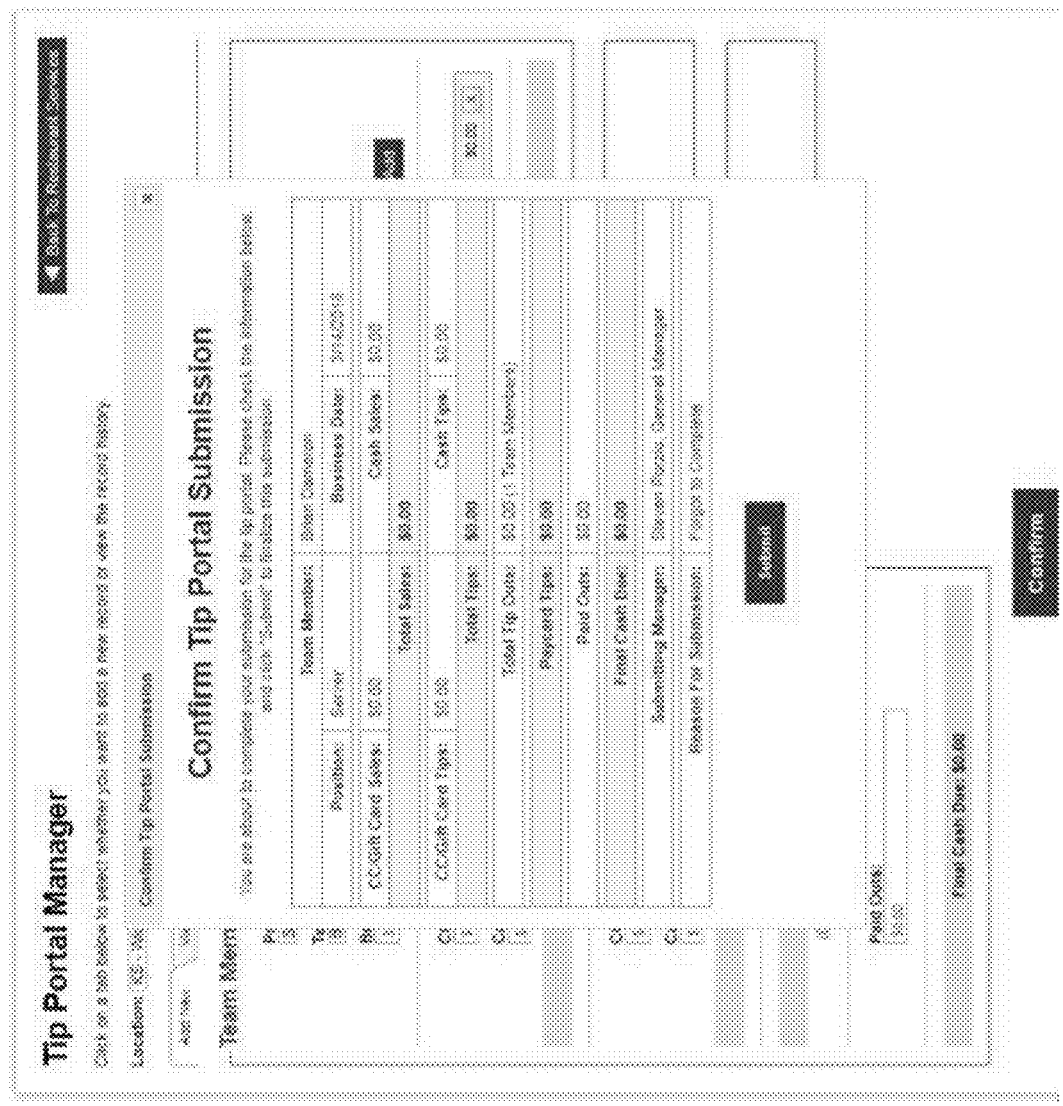

Referring to FIG. 5U, when the manager activates a confirm control on the user interface of FIG. 5T, the user interface depicted in FIG. 5U pops up, overlaying the user interface of FIG. 5U. The user interface may provide a form including the manually submitted data. If the data is correct, the manager may activate a submit control. A notification may be presented indicating if the load request has been approved or denied. Optionally, the portal only permits a certain number of attempts to input a manual load, and if that limit is met, the system may provide a corresponding notification and prevent a further attempted submission without the permission of an authorized administrator.

Figure 5V:
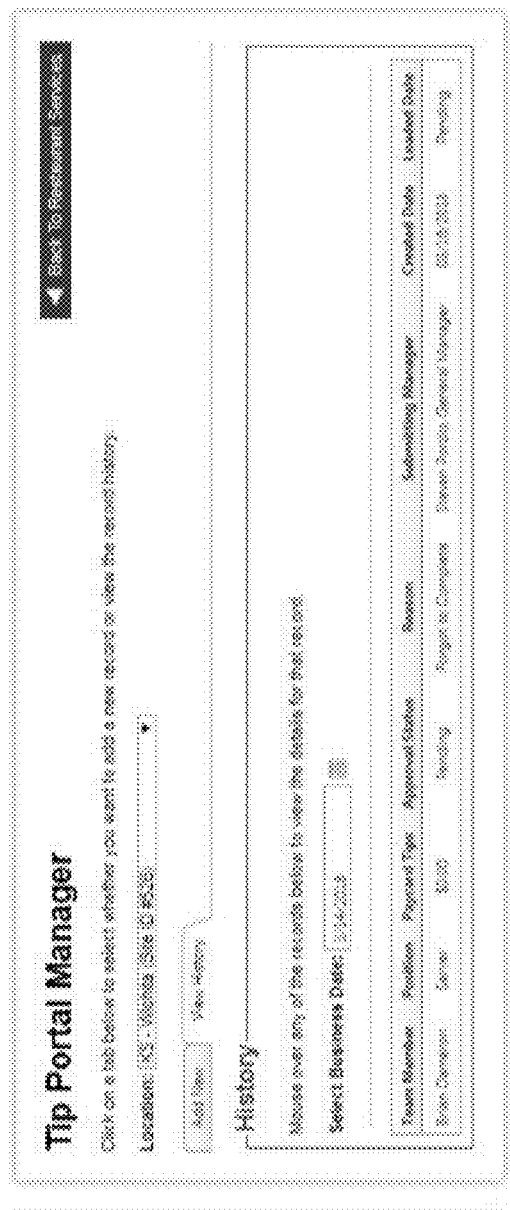

Referring to the example user interface illustrated in FIG. 5V, to view the status of added tip portal entry, a manager may select the location of interest from a location menu, select the tab that says "View History," and select the business date of interest from a business data field. The corresponding approval status, and the date and time the request was loaded, will be listed. The manager can hover a cursor or pointer over a given record, and the details of the tip load request may be accessed and presented.

Figure 5W:
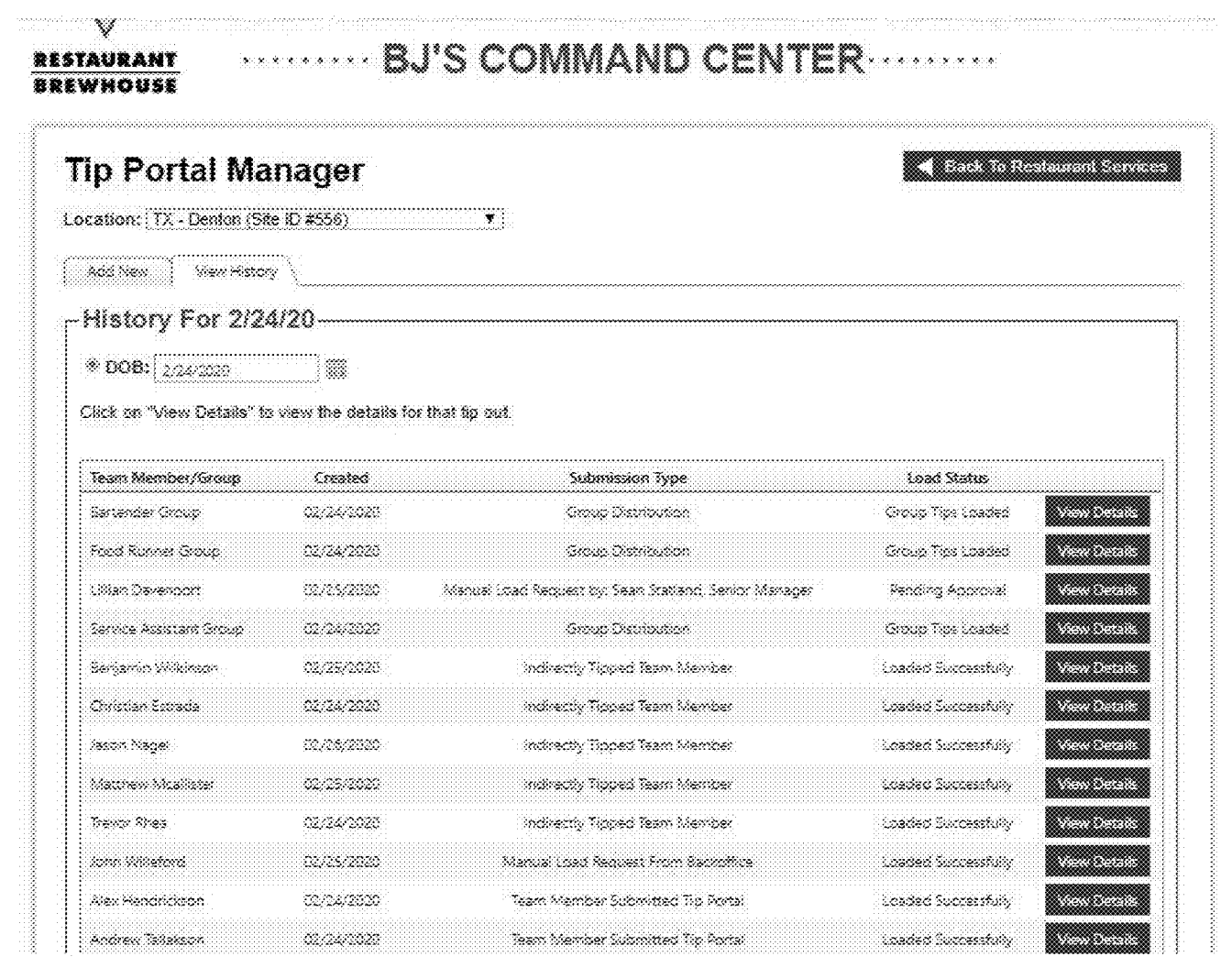

Referring to the example user interface illustrated in FIG. 5W, in the History section of portal manager, the manager (or other authorized user) can view the status of all workers for each selected day, including the worker name, record creation date, submission type (e.g., worker submitted tip, manual load request (with an identifier of the requester), indirectly tipped worker, group distribution, etc.), and load status (e.g., group tips loaded, pending approval, loaded successfully, etc.). A view details control is provided that, when activated, causes additional information to be presented. Workers may also be provided with access to their personal information via the portal (e.g., name, date of birth, address, phone number, etc.).

The portal and associated functionality and user interfaces enable a variety of exception conditions to be managed. For example, if a worker informs a manager that the worker did not receive their tips in their financial account or added to their payroll account, the worker may be instructed to confirm, via a website of mobile device application that provides access to their financial account transaction, that the tips were not loaded. Further, the manager can be enabled to verify via the portal user interfaces accessed via a point of sale terminal or other device (e.g., a mobile device having a corresponding application installed thereon), that needed data has been provided. For example, if the submission status indicates that the submission is not present, the manager may access the portal manager user interface and provide the needed data on behalf of the worker. If the submission status indicates that the submission is present, the manager may access the portal manager user interface and verify if and when funds were loaded. If a determination is made that the funds were not loaded, the manager may submit, via the portal, a trouble report by selecting (e.g., a via a support requested menu) "Tips Not Loaded."

Optionally, different terminal types used to access the portal may be granted different access and/or edit rights based on the terminal type (rather than based solely on the permissions granted to the person accessing the portal). For example, if the user is accessing the back office portal manager (e.g., accessed via a back office system computer), the user may be enabled to create an entry, view the status of an open entry, and/or generate and access reports (such as those discussed herein). However, the user accessing the back office portal manager may be inhibited from editing entries, viewing historical tip data, verifying tip distributions, and/or reprinting tip portal chits. A user accessing the tip portal manager via a certain type of point of sale system may be enabled to edit entries, view tip histories, verify tip distributions, and reprint tip portal chits (but may be inhibited from creating entries, viewing the status of open entries, and/or generating reports).

A worker accessing data regarding other worker tips may be inhibited from sharing such data with other workers.

Figure 5X:
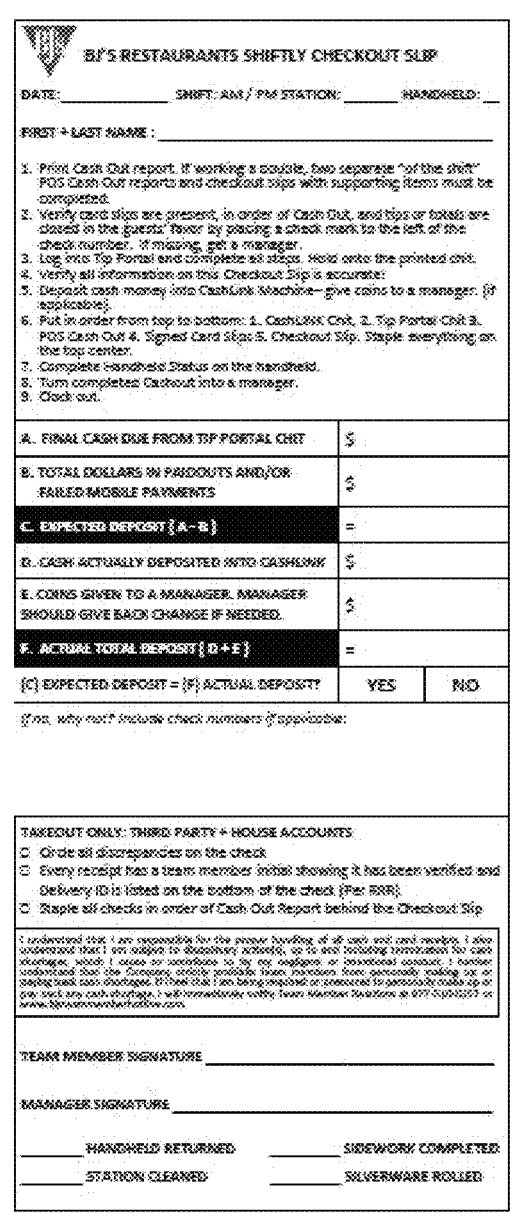

FIG. 5X illustrates an example cash out slip. When a worker is to cash out, the worker may print out or access via a terminal a print cash out report from the portal. If the worker is working a split or double shift, or across multiple shifts, the worker may complete a separate "of the shift" POS cash out report and checkout slip for each shift (with supporting items). The presence of card slips may be verified, in order of cash out, and tips or totals are closed (e.g., in the customer's favor). The worker may then clock out via the portal or a separate clock.

Thus, systems and methods are provided that enhance secure networked communication of sensitive data amongst terminals and systems, that enable resources (e.g., tips, tokens, or the like) to be efficiently and securely distributed, that provide user interfaces that enable data to be efficiently presented, and that enable the reduction of navigation needed to access such data and associated controls.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources, or may comprise a standalone system. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

While the phrase "click" may be used with respect to a user selecting a control, menu selection, or the like, other user inputs may be used, such as voice commands, text entry, gestures, etc. User inputs may, by way of example, be provided via an interface, such as via text fields, wherein a user enters text, and/or via a menu selection (e.g., a drop down menu, a list or other arrangement via which the user can check via a check box or otherwise make a selection or selections, a group of individually selectable icons, etc.). When the user provides an input or activates a control, a corresponding computing system may perform the corresponding operation. Some or all of the data, inputs and instructions provided by a user may optionally be stored in a system data store (e.g., a database), from which the system may access and retrieve such data, inputs, and instructions. The notifications and user interfaces described herein may be provided via a Web page, a dedicated or non-dedicated phone or mobile application, computer application, a short messaging service message (e.g., SMS, MMS, etc.), instant messaging, email, push notification, audibly, via haptic feedback, and/or otherwise.

The user terminals described herein may be in the form of a mobile communication device (e.g., a cell phone), laptop, tablet computer, interactive television, game console, media streaming device, head-wearable display, networked watch, etc. The user terminals may optionally include displays, user input devices (e.g., touchscreen, keyboard, mouse, microphone, camera, touch pad, etc.), network interfaces, etc.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. An authentication and encryption computer system that encrypts, decrypts, and tokenizes sensitive data to enhance secure network communications, the authentication and encryption computer system comprising:
   one or more processing devices;
   a network interface;
   non-transitory memory that stores instructions that when executed by the one or more processing devices are configured to cause the authentication and encryption computer system to perform operations comprising:
   establish an encrypted communication channel with a point of sale (POS) device at a first location;
   receive, over the encrypted communication channel from the point of sale (POS) device, information decrypted using a first key, the information including transaction information for a first transaction, including an instrument identifier, a first amount for acquisition of a first set of items by a first person, a second amount specified by the first person, and information enabling an identification of a service person at the first location involved in providing the first set of items to the first person at the first location,
   tokenizing, using the POS device at least a first item of sensitive data related to the first person before transmitting a corresponding token, wherein the first item of sensitive data is replaced with non-sensitive data so that the first item of sensitive data is not exposed during an authentication process;
   identify a first shift comprising a specified start time and a specified end time associated with the first transaction at the first location;
   receive, via the network interface, a communication from a wireless first device physically separate from the authentication and encryption computer system, wherein the first device is a mobile device;

authenticate an identity of a user of the first device, the first device in communication with the authentication and encryption computer system, as being the service person;

at least partly in response to authenticating the identity of the user of the first device as being the service person:

provide, via the first device used by the service person, a user interface configured for a mobile device, the user interface including, at a same time, the second amount specified by the first person and an identification of one or more service people and/or groups of service people that are at the first location during the first shift comprising the specified start time and the specified end time to thereby reduce the amount of navigation needed among user interfaces;

receive, via the user interface an instruction from the service person to:

distribute at least a specified portion, specified by the service person, of the second amount to one or more specified service people that are at the first location during the first shift comprising the specified start time and the specified end time, and/or groups of service people, specified by the service person, that are at the first location during the first shift comprising the specified start time and the specified end time;

aggregate specified portions from one or more services persons, specified via respective networked devices over one or more encrypted communication channels, to be distributed to one or more specified service people that are at the first location during the first shift comprising the specified start time and the specified end time with the portion of the second amount thereby reducing a quantity of transactions needed, and correspondingly decreasing an amount of network, processor, and memory resources needed; and communicate with one or more systems to cause the specified aggregated portions to be added by the one or more systems among respective destinations, comprising electronic accounts associated with the specified service that are at the first location during the first shift comprising the specified start time and the specified end time and/or groups of service people that are at the first location during the first shift comprising the specified start time and the specified end time.

2. The authentication and encryption computer system as defined in claim 1, wherein the first item of sensitive data tokenized by POS device comprises a credit card number.

3. The authentication and encryption computer system as defined in claim 1, wherein the tokenized sensitive data is stored remotely in a token vault.

4. The authentication and encryption computer system as defined in claim 1, wherein the POS device is configured to transmit payment data to a payment gateway, to encrypt the payment data.

5. The authentication and encryption computer system as defined in claim 1, wherein the POS device is configured to transmit encrypted payment data to a payment gateway to add another layer of encryption to the payment data.

6. The authentication and encryption computer system as defined in claim 1, wherein the authentication and encryption computer system is configured to, in response to receiving the service person instruction to distribute at least a specified portion of the second amount to one or more specified service people and/or groups of service people, start a timer for a predetermined time, wherein the service person is enabled to modify the instruction to distribute at least a specified portion of the second amount to one or more specified service people and/or groups of service people prior to an expiration of the timer, and is inhibited from modifying the instruction to distribute at least a specified portion of the second amount to one or more specified service people and/or groups of service people after expiration of the timer.

7. The authentication and encryption computer system as defined in claim 1, wherein the authentication and encryption computer system is configured-to-access data indicating dates and time periods when one or more service people were at the first location, wherein the identification of one or more service people is based at least in part on the accessed data indicating dates and time periods when one or more service people were at the first location.

8. The authentication and encryption computer system as defined in claim 1, wherein the first device comprises a mobile computing device.

9. The authentication and encryption computer system as defined in claim 1, wherein the authentication and encryption computer system is configured to determine if at least a first portion of the second amount has not been distributed by a first threshold time, and at least partly in response to determining that at least a first portion of the second amount has not been distributed by the first threshold time, generate a prompt for an authorized user to distribute the first portion.

10. A computer-implemented method, the method comprising:

establishing an encrypted communication channel with a point of sale (POS) device at a first location;

receiving over the encrypted communication channel from the point of sale (POS) device information including transaction information for a first transaction, including an instrument identifier, a first amount for acquisition of a first set of items by a first person, a second amount specified by the first person, and information enabling an identification of a service person involved in providing the first set of items to the first person at the first location;

tokenizing, using the POS device, at least a first item of sensitive data related to the first person before transmitting a corresponding token, wherein the first item of sensitive data is replaced with non-sensitive data so that the first item of sensitive data is not exposed during an authentication process;

decrypting, using a key, the information including transaction information for a first transaction, including the instrument identifier, the first amount for acquisition of a first set of items by a first person, the second amount specified by the first person, and information enabling an identification of the service person involved in providing the first set of items to the first person at the first location, identify a first shift comprising a specified start time and a specified end time associated with the first transaction at the first location;

receiving a wireless communication from a first device;

authenticating an identity of a user associated with the first device as being the service person;

at least partly in response to authenticating the identity of the user of the first device as being the service person:

enabling, via the first device used by the service person, a user interface to be provided, the user interface including the second amount and an identification of one or more service people and/or groups of service people that are at the first location during the first shift comprising the specified start time and the specified end time;

receiving, via the user interface, an instruction from the service person to distribute at least a specified portion of the second amount to one or more specified service people and/or groups of service people that are at the first location during the first shift comprising the specified start time and the specified end time;

aggregating specified portions from one or more services persons, specified via respective networked devices over one or more encrypted communication channels, to be distributed to one or more specified service people that are at the first location during the first shift comprising the specified start time and the specified end time with the portion of the second amount thereby reducing a quantity of transactions needed, and correspondingly decreasing an amount of network, processor, and memory resources needed; and communicating with one or more computer systems to cause the aggregated specified portions to be added by the one or more computer systems among respective destinations associated with the specified service people and/or groups of service people that are at the first location during the first shift comprising the specified start time and the specified end time.

11. The method as defined in claim 10, wherein the POS device tokenizes at least the first item of sensitive data before transmitting a corresponding token.

12. The method as defined in claim 10, wherein the POS device tokenizes at least the first item of sensitive data before transmitting a corresponding token, where the sensitive data is stored remotely in a token vault.

13. The method as defined in claim 10, wherein the POS device is configured to transmit payment data to a payment gateway, wherein the payment gateway encrypts the payment data.

14. The method as defined in claim 10, wherein the POS device is configured to transmit encrypted payment data to a payment gateway, wherein the payment gateway adds another layer of encryption to the payment data.

15. The method as defined in claim 10, the method further comprising: in response to receiving the service person instruction to distribute at least a specified portion of the second amount to one or more specified service people and/or groups of service people, starting a timer for a predetermined time, wherein the service person is enabled to modify the instruction to distribute at least a specified portion of the second amount to one or more specified service people and/or groups of service people prior to an expiration of the timer, and is inhibited from modifying the instruction to distribute at least a specified portion of the second amount to one or more specified service people and/or groups of service people after expiration of the timer.

16. The method as defined in claim 10, the method further comprising accessing data indicating dates and time periods when one or more service people were at the first location, wherein the identification of one or more service people is based at least in part on the accessed data indicating dates and time periods when one or more service people were at the first location.

17. The method as defined in claim 10, wherein the first device comprises a mobile computing device.

18. The method as defined in claim 10, the method further comprising: determining if at least a first portion of the second amount has not been distributed by a first threshold time, and at least partly in response to determining that at least a first portion of the second amount has not been distributed by the first threshold time, generating a prompt for an authorized user to distribute the first portion.

* * * * *

UNITED STATES PATENT AND TRADEMARK OFFICE
CERTIFICATE OF CORRECTION

PATENT NO. : 11,928,671 B2
APPLICATION NO. : 17/393159
DATED : March 12, 2024
INVENTOR(S) : Brian Scott Krakower et al.

It is certified that error appears in the above-identified patent and that said Letters Patent is hereby corrected as shown below:

In the Claims

On Column 26, Line 12: In Claim 7, delete "configured-to-access" and insert -- configured to access --.

Signed and Sealed this
Twenty-first Day of May, 2024

Katherine Kelly Vidal
Director of the United States Patent and Trademark Office